US005995268A

United States Patent [19]
Shiraishi et al.

[11] Patent Number: 5,995,268
[45] Date of Patent: Nov. 30, 1999

[54] MULTI-BEAM EXPOSURE UNIT

[75] Inventors: Takashi Shiraishi, Kawasaki; Masao Yamaguchi, Funabashi; Yasuyuki Fukutome, Tokyo, all of Japan

[73] Assignee: Kabushiki Kaisha Toshiba, Kawasaki, Japan

[21] Appl. No.: 09/158,552

[22] Filed: Sep. 22, 1998

[30] Foreign Application Priority Data

Sep. 22, 1997 [JP] Japan .................................. 9-257350

[51] Int. Cl.⁶ .................................................. G02B 26/08
[52] U.S. Cl. ........................ 359/204; 359/210; 359/211; 359/216; 347/243
[58] Field of Search .......................... 359/204, 209–211, 359/216–219, 831, 837; 347/232, 233, 238, 241–243

[56] References Cited

U.S. PATENT DOCUMENTS

| 5,255,115 | 10/1993 | Kikuchi | 359/211 |
| 5,469,290 | 11/1995 | Maeda | 359/210 |
| 5,715,078 | 2/1998 | Shiraishi | 359/204 |
| 5,798,784 | 8/1998 | Nonaka et al. | 347/243 |
| 5,812,299 | 9/1998 | Minakuchi et al. | 359/211 |

*Primary Examiner*—James Phan
*Attorney, Agent, or Firm*—Foley & Lardner

[57] ABSTRACT

According to the present invention, there is provided an improved multi-beam exposure unit using a plurality of beams for scanning, in which shifts between the beams are reduced so that images can be accurately superposed without color shifts or variations in beam spaces. The multi-beam exposure unit according to the invention has a pre-deflection optical system, which includes light sources, each having light-emitting points arranged individually in the respective positions of the vertexes of a triangle defined by m=3, and a mechanism for collectively adjusting the sub-scanning-direction spaces between light beams from the light sources on an image surface, a deflector having rotatable reflecting surfaces and capable of deflecting the light beams from the pre-deflection optical system in predetermined directions by rotating the reflecting surfaces at a predetermined speed, and a post-deflection optical system for continuously focusing m number of light beams, deflected by the deflector, on the image surface. Thus, the spaces between the three light beams in the sub-scanning direction can be equalized substantially.

19 Claims, 9 Drawing Sheets

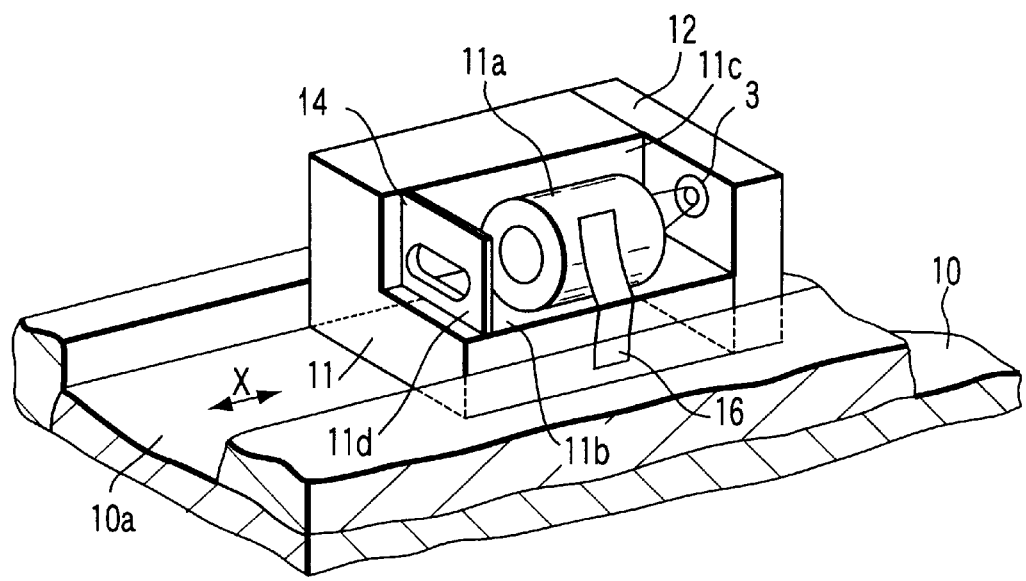
F I G. 3
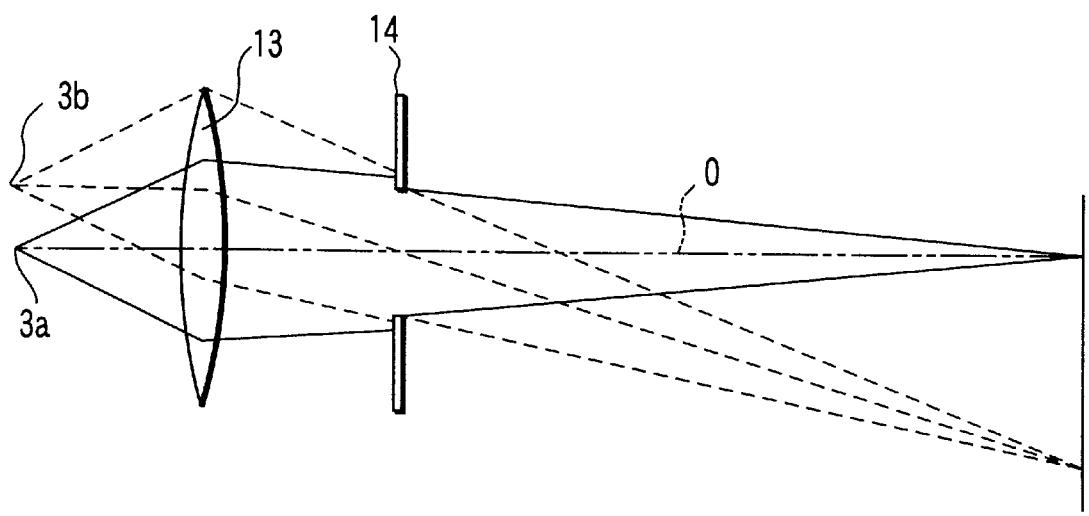
F I G. 4

MULTI-BEAM EXPOSURE UNIT

BACKGROUND OF THE INVENTION

The present invention relates to multi-beam exposure units for multi-beam scanning, adapted to be used in multi-drum color printers and copiers, multicolor printers and copiers, single-color high-speed laser printers, single-color high-speed digital copiers, etc.

An image forming apparatus, such as a color printer or copier using a plurality of image forming units that include a photoconductor drum each, employs an exposure unit that can provide a plurality of light beams as many as a plurality of image data corresponding to color-separated color components, that is, as many as the image forming units at the least.

Exposure units of this type include a plurality of semiconductor laser devices, first lens group, deflector, second lens group, etc. The laser devices emit a predetermined number of light beams corresponding to the image data for the individual separated color components. The first lens group serves to reduce the cross section of each light beam from each laser device to a predetermined size and shape. The deflector deflects light beams, reduced to the predetermined size and shape by the first lens group, by continuously reflecting them in a direction perpendicular to the direction in which a recording medium, carrying thereon an image formed by means of each light beam, is transported. The second lens group serves to focus each light beam deflected by the deflector on a predetermined portion of the recording medium. In many cases, the direction in which each light beam is deflected by the deflector is regarded or referred to as a main-scanning direction, and the direction in which the recording medium is transported, that is, a direction perpendicular to the main-scanning direction, as a sub-scanning direction.

Some image forming apparatuses use a plurality of exposure units that correspond individually to the image forming units, while others use only one exposure unit or multi-beam exposure unit that can singly provide a plurality of light beams. These days, high-speed printers are proposed to ensure higher image forming speed and improved image resolution. In these printers, image data of the same color are exposed in parallel with one another so that high-resolution images can be formed at higher speed.

If the rotational frequency of reflecting surfaces of the deflector is expected to be increased to ensure high-speed, high-resolution image formation, in one such exposure unit, high-speed rotation of the reflecting surfaces requires use of an expensive bearing such as a pneumatic bearing. On the other hand, the motor speed has its upper limit, and a motor for high-speed rotation costs high, requiring an expensive driver circuit. The increase in the rotational frequency of the reflecting surfaces cannot cover this increase in cost. Moreover, increasing the rotating speed of the reflecting surfaces accelerates windage loss of the reflecting surfaces and entails louder windage noises.

In contrast with this, the increase of the motor speed can be restrained by increasing the reflecting surfaces in number. If this is done, however, the image frequency is augmented, so that noise components, which are probably superposed on image signals (image data), increase inevitably. The augmentation of the image frequency, however, imposes various restrictions on the control circuit design or mounting.

Accordingly, multi-beam exposure has already been proposed as a method for lowering the rotational frequency of the reflecting surfaces and the image frequency. In this method, a plurality of light beams are allotted individually to color-separated color components and deflected (for scanning) at a time. However, the multi-beam exposure involves the following various problems.

If U number of groups of light beams are used as light sources, corresponding to the number of the color-separated color components, and if V number of light beams are provided for each color component, the number of necessary semiconductor laser devices is U×V. Therefore, the number of light beams to be deflected by the deflector is U×V. In order to deflect these light beams collectively, U×V number of semiconductor lasers and first lenses and U×V–1 number of half-mirrors are needed to put together the U number of groups of light beams, each including V number of light beams. In consequence, the number of necessary components is increased, thus entailing higher cost.

In the case where a plurality of image forming units, e.g., W=4 in number in general, are provided corresponding individually to the color components to be used in a color copying apparatus or the like, moreover, the semiconductor lasers, first lenses, and half-mirrors in the aforesaid numbers must be provided in W number of sets. Accordingly, the size of the apparatus is also increased. In this case, furthermore, it is necessary to secure a space that is wide enough to hold all the elements.

On the other hand, the numbers of semiconductor lasers and first lenses can be reduced by using semiconductor laser arrays that include X number of light emitting points each. In this case, however, control of the space between each light beam and its adjacent ones or the next one to be deflected is complicated in a direction perpendicular to the direction in which the light beams are deflected by the deflector. If the space from each adjacent light beam or the next one to be deflected is changed slightly, the light beams are projected without being fully superposed in the direction perpendicular to the direction of deflection, so that jitters increase to lower the resolution.

The use of the semiconductor laser arrays that use X number of light-emitting points each allows some light beams that pass through lenses for converting the beams into a parallel or convergent beam to pass through any other portions of the lenses than the centers thereof. Therefore, aberrations for all the light beams can be corrected uniformly. In other words, it is difficult to equalize the aberrations for all the light beams by the same process of correction. Thus, the control for the space from each adjacent light beam or the next one to be deflected is restricted within a certain range.

Variation of the space from each adjacent light beam or the next one to be deflected results in uneven image density as well as increased jitters. This further causes the color copying machine to suffer unevenness of colors and color shifts.

BRIEF SUMMARY OF THE INVENTION

The object of the present invention is to provide an exposure unit for multi-beam scanning, in which shifts between beams are reduced so that images can be accurately superposed without color shifts or variations in beam spaces.

According to the present invention, there is provided a multi-beam exposure unit comprising: deflecting means for deflecting light beams in a first direction by rotating a rotatable reflecting surface at a predetermined speed; n (integer not smaller than 2) number of light sources each having m (integer not smaller than 2) number of light-emitting points and capable of emitting (m×n) number of light beams, the space between each two adjacent light beams emitted from the light sources being defined to be equivalent to n number of dots on an image surface with respect to a second direction perpendicular to the first direction in which the light beams are deflected; n number of beam space adjusting mechanisms for collectively adjusting the spaces between the light beams from the light sources in the second direction on the image surface for each m number of light beams; (n−1) number of beam position adjusting mechanisms for adjusting the positions of the m number of light beams from the light sources on the image surface; (n−1) number of first composition mirrors adapted to transmit a predetermined percentage of the light quantity of the light beams and reflect the remaining percentage, whereby the (m×n) number of light beams are put together into one luminous flux passing substantially through one and the same optical path; and focusing optical means for continuously focusing the (m×n) number of light beams, deflected in the first direction by the deflecting means, on the image surface.

According to the invention, moreover, there is provided a multi-beam exposure unit comprising: deflecting means for deflecting light beams in a first direction by rotating a rotatable reflecting surface at a predetermined speed; light sources each having light-emitting points located on the three vertexes of a triangle and capable of emitting three light beams close to one another; beam space adjusting mechanisms for collectively adjusting the spaces between the three light beams from the light sources in a second direction perpendicular to the first direction, on an image surface; and focusing optical means for continuously focusing the light beams, deflected by the deflecting means, on the image surface.

According to the invention, furthermore, there is provided a multi-beam exposure unit comprising:

($n_1+n_2+ \ldots n_k$) number of light sources each having m (integer not smaller than 2) number of light-emitting points and capable of providing (m×($n_1+n_2+ \ldots n_k$)) number of light beams; beam space adjusting mechanisms for collectively adjusting the beam spaces on an image surface for first and second cycles of exposure for each group of light sources, the adjusting mechanisms being provided individually for optical paths for the passage of the light beams emitted from the k number of groups of light sources; (k−1) number of second composition mirrors for putting the (m× ($n_1+n_2+ \ldots n_k$)) number of light beams together into one luminous flux passing substantially through one and the same optical path in the first direction; deflecting means for deflecting the (m×($n_1+n_2+ \ldots n_k$)) number of light beams in the form of the luminous flux in predetermined directions by rotating a rotatable reflecting surface at a predetermined speed; and focusing optical means for continuously focusing the (m×($n_1+n_2+ \ldots n_k$)) number of light beams, deflected by the deflecting means, on the image surface.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 3 is a schematic view showing an arrangement of a lens holder and a light source used in the exposure unit shown in FIGS. 1 and 2;

FIG. 4 is a schematic view for illustrating the relative positions of the light source and an aperture stop in the lens holder shown in FIG. 3;

DETAILED DESCRIPTION OF THE INVENTION

An embodiment of the present invention will now be described in detail with reference to the accompanying drawings.

Figure 1:
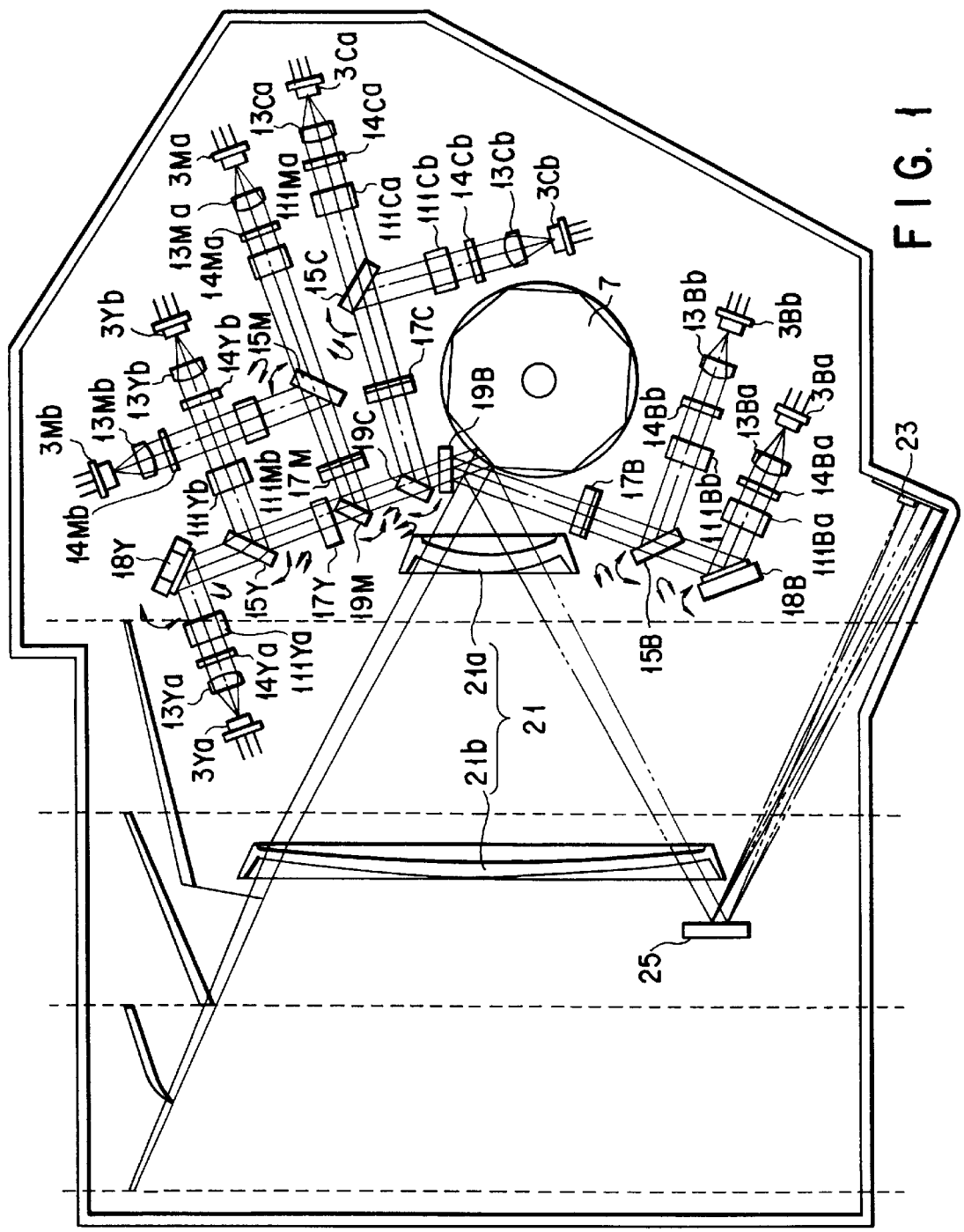
FIG. 1 is a schematic plan view showing an example of a multi-beam exposure unit according to an embodiment of the present invention.
Figure 2:
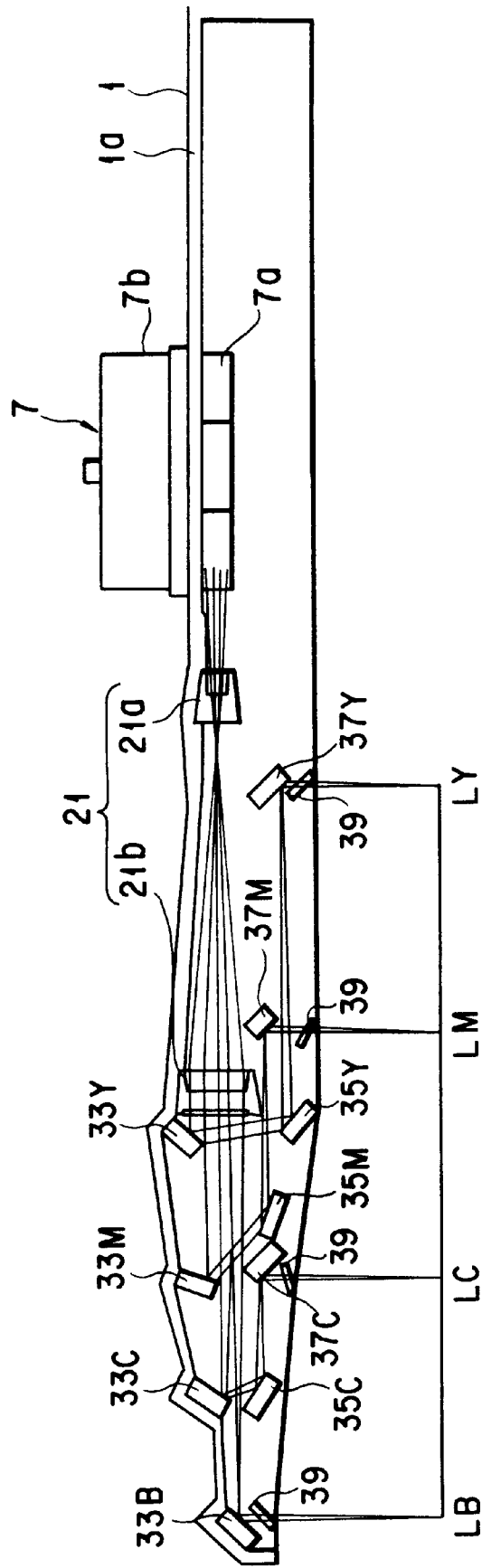
FIG. 2 is a schematic side view of the exposure unit shown in FIG. 1.

FIGS. 1 and 2 show a multi-beam exposure unit according to the embodiment of the invention, which is incorporated in an image forming apparatus for forming a color image in accordance with image information that is color-separated into, for example, four color components. FIG. 1 is a schematic plan view showing the exposure unit without a cover, and FIG. 2 is a schematic side view of the exposure unit shown in FIG. 1. In general, in the color image forming apparatus that uses the image information for the four color components, four pieces of image information that are color-separated for the individual color components, Y (yellow), M (magenta), C (cyan) and B (black, used for inking such that image regions in which yellow, magenta, and cyan are superposed to bring out a blackish color are monochromated and for the formation of black monochrome images such as letters in manuscripts), and four sets of various mechanisms for forming images for the individual color components Y, M, C and B are used to obtain a desired color based on subtractive primaries. Accordingly, the image information for the individual color components and the mechanisms corresponding thereto are discriminated by subscripts Y, M, C and B that are attached to their corresponding reference numerals. The inventor hereof has formerly filed applications for the body of the image forming apparatus and its control sections (for operation control), processing for image information signals, etc., and their particulars are described in U.S. Pat. No. 5,715,078 (patented Feb. 3, 1998). Therefore, a detailed description of these particulars is omitted herein.

The multi-beam exposure unit 1 has light sources 3Y, 3M, 3C and 3B and a deflector 7 for use as deflecting means. The light sources 3Y, 3M, 3C and 3B deliver laser beams individually to four image forming sections of the image forming apparatus body (not shown). The deflector 7 deflects (for scanning) the laser beams emitted from the light sources 3 (Y, M, C and B) toward the image surfaces in predetermined positions (or photoconductor drums provided individually for the four image forming sections of the image forming apparatus body) at a predetermined linear speed. A pre-deflection optical system 5 is located between the deflector 7 and the light sources 3, while a post-deflection optical system 9 is located between the deflector 7 and the image surfaces (not shown). The direction in which the laser beams are deflected (for scanning) by the deflector 7 are referred to as the main-scanning direction, the direction perpendicular to the main-scanning direction and a reference axis for deflecting action of the deflector 7 on the laser beams such that the laser beams advance in the main-scanning direction is referred to as the sub-scanning direction. Thus, the sub-scanning direction of the laser beams deflected by the multi-beam exposure unit 1 is a direction in which a recording sheet is transported in the image forming apparatus body, and is coincident with the direction in which the photoconductor drums are rotated. Further, the main-scanning direction is a direction (axial direction of the photoconductor drums) perpendicular to the direction in which the recording sheet is transported.

The deflector 7 includes a polygonal mirror body 7a and a motor 7b. For example, the mirror body 7a has eight plane reflecting surfaces (plane reflectors) that are arranged in the shape of a regular polygon. The motor 7b rotates the mirror body 7a at a predetermined speed in the main-scanning direction. The mirror body 7a is formed integrally with the rotating shaft of the motor 7b.

The polygonal mirror body 7a is form of aluminum, for example. The reflecting surfaces of the mirror body 7a is obtained by cutting the body structure in the sub-scanning direction and then depositing a surface protection layer of silicon dioxide ($SiO_2$) or the like on the resulting cut surfaces.

The post-deflection optical system 9 includes a horizontal sync detector 23, return mirror 25 for horizontal sync, first and second focusing lenses 21a and 21b, mirrors 33Y (first yellow), 35Y (second yellow), 37Y (third yellow), 33M (first magenta), 35M (second magenta), 37M (third magenta), 33C (first cyan), 35C (second cyan), 37C (third cyan) and 33B (black only), and dustproof glasses 39Y, 39M, 39C and 39B. The detector 23 detects laser beams LY, LM, LC and LB deflected by the deflector 7 to secure horizontal sync alignment for the laser beams L. The mirror 25 serves to turn back the laser beams L toward the detector 23. The focusing lenses 21a and 21b optimize the shapes and positions of the laser beams L (Y, M, C and B), deflected (for scanning) by the polygonal mirror body 7a, on the image surfaces. The mirrors 33Y to 33B guide the laser beams L (Y, M, C and B) emerging from the second focusing lens 21b to their corresponding photoconductor drums (image surfaces). The dustproof glasses 39 (Y, M, C and B) protect the multi-beam exposure unit 1, which includes the various optical elements described above, against dust.

The pre-deflection optical system 5 between the deflector 7 and lasers 3Ya, 3Yb, 3Ma, 3Mb, 3Ca, 3Cb, 3Ba and 3Bb, which constitute the light sources 3 (Y, M, C and B), will now be described in detail for each laser.

Figure 8:
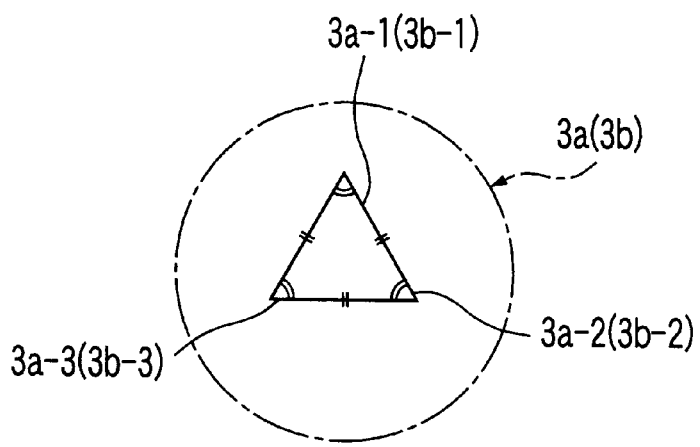
FIG. 8 is a schematic view for illustrating an arrangement of three light-emitting points of a semiconductor laser element for use as a light source of the exposure unit shown in FIGS. 1 and 2.

The light sources 3Y, 3M, 3C and 3B include, respectively, the first and second yellow lasers 3Ya and 3Yb for emitting the laser beam LY, first and second magenta lasers 3Ma and 3Mb for emitting the laser beam LM, first and second cyan lasers 3Ca and 3Cb for emitting the laser beam LC, and first and second black lasers 3Ba and 3Bb for emitting the laser beam LB. The individual laser elements, which will be described later with reference to FIG. 8, are semiconductor laser arrays that have light emitting portions on the vertexes of a triangle (equilateral triangle) each and can provide multi-beams.

The pre-deflection optical system 5 includes finite-focus lenses 13, aperture stops 14, cylinder lenses 17, and half-mirrors 15. The finite-focus lenses 13 give a predetermined convergence to the laser beams L emitted individually from the lasers 3Ya, 3Yb, 3Ma, 3Mb, 3Ca, 3Cb, 3Ba and 3Bb. The aperture stops 14 give a desired sectional beam shape to the laser beams L passed through the lenses 13. The cylinder lenses 17 give an additional predetermined convergence to the laser beams L passed through the aperture stops 14 with respect to the sub-scanning direction. The half-mirrors 15, which are situated been their corresponding cylinder lenses 17 and aperture stops 14. Thus, the optical system 5 regulates the laser beams L emitted from the individual lasers 3 into a desired sectional beam shape, and guides them onto the reflecting surfaces of the deflector 7. Each finite-focus lens 13 is a lens obtained by, for example, pasting a ultraviolet-curing aspherical plastic lens (not shown) on the incident and/or emitting surface of aspherical or aspherical glass lens (or by integrally forming the plastic lens) or an aspherical glass lens. The lasers 3, finite-focus lenses 13, and aperture stops 14 are held together with by means of lens holders 11, which will be described later with reference to FIG. 3.

If the number of color-separated color components k is 4, the laser beams LYa, LYb, LMa, LMb, LCa, LCb, LBa and LBb emitted individually from the lasers 3Ya, 3Yb, 3Ma, 3Mb, 3Ca, 3Cb, 3Ba and 3Bb are synthesized for each color component by means of four grouped composition mirrors, that is, first composition mirrors 15Y, 15M, 15C and 15B, the number of which is given by $n_1+n_2+n_3+n_4-k=2+2+2+2-4=4$, further synthesized by means of three second composition mirrors 19M, 19C and 19B, the number of which is given by $k-1=4-1=3$, and guided toward the deflector 7. The first composition mirrors 15Y, 15M, 15C and 15B are half-mirrors that reflect approximately 50% of the incident lasers and also transmit approximately 50% each.

Since $n_1=n_2=n_3=n_4=2$ and m (number of light-emitting points) 3 are given, the total number of laser beams L radiated individually from the lasers 3Ya, 3Yb, 3Ma, 3Mb, 3Ca, 3Cb, 3Ba and 3Bb toward the deflector 7 is equal to m×8 (=2+2+2+2), that is, 3×8=24. More specifically, there are laser beams LYa-1, LYa-2, LYa-3, LYb-1, LYb-2, LYb-3, LMa-1, LMa-2, LMa-3, LMb-1, LMb-2, LMb-3, LCa-1, LCa-2, LCa-3, LCb-1, LCb-2, LCb-3, LBa-1, LBa-2, LBa-3, LBb-1, LBb-2 and LBb-3. Thus, although the laser beams L corresponding to optional colors cannot be discriminated on the drawings, three beams are put together on the front side (light source side) of each of the half-mirrors (Y, M, C and B), and six (=2×3) beams on the rear side (deflector side).

As shown in FIG. 3, each lens holder 11 (representative corresponding to an optional one of the lasers 3 is shown) is formed of, for example, die-cast aluminum that ensures high machining accuracy and changes little in shape with temperature change. The holder 11 is located on a base plate 10 for holding the components of the pre-deflection optical system 5 so as to be movable in the direction of arrow X over a recess 10a in the plate 10. The base plate 10 is situated on an intermediate base 1a of the exposure unit 1.

The lens holder 11 includes a holder body 11a for holding the laser 3 and the finite-focus lens 13 with a predetermined space between them. The laser 3 is fixed to a laser holder 12 of die-cast aluminum, a material substantially equivalent to that of the lens holder 11. The lens holder 11 holds the lens 13 at a predetermined distance from the light-emitting point of the laser 3 or the position where the holder body 11a touches the laser holder 12. More specifically, the finite-focus lens 13 is a cylindrical-flanged lens having a cylindrical flange. It is fixed to the lens holder 11 in a manner such that it is held against a side face 11c and a bottom 11b of the holder body 11a by means of a leaf spring 16. The spring 16 is located so that it can be pressed toward the side face 11c from beside a bottom portion 11b of the holder body 11a and a bottom 11b of the lens holder 11. Thus, the lens 13 is movable in the holder body 11a along an optical axis o (in a direction of arrow X) that extends through the lens 13 toward the cylinder lens 17, and is fixed to the lens holder 11 so as to maintain the predetermined space from the laser 3 that is fixed to the laser holder 12. The lens holder 11 further allows to change a distance of the laser beams of the image surface in the sub-scanning direction by rotation with the optical axis O, in contrast with a moved in an X direction mentioned later.

FIG. 4 is a schematic view showing the finite-focus lens 13 and the aperture stop 14 in the lens holder 11, extracted as they are arranged along the optical axis O, along with an optional laser beam L as a representative. By locating the aperture stop 14 in a rear focal plane of the lens 13, as shown in FIG. 4, the respective efficiencies of the laser beam LYa, LMa, LCa or LBa and the laser beam LYb, LMb, LCb or LBb that are emitted from the laser 3Ya, 3Ma, 3Ca or 3Ba and the laser 3Yb, 3Mb, 3Cb or 3Bb can be made substantially equal. The aperture stop 14 is fixed to an aperture stop holding portion 11d in a predetermined position in the lens holder 11 such that it is situated in a focal position behind the finite-focus lens 13, as shown in FIG. 4. The optical axis O is defined to be substantially parallel to the direction in which the recess 10a of the base plate 10 extends.

Referring again to FIG. 1, the half-mirrors 15 (Y, M, C and B) are designed to have predetermined transmittance and reflectance by depositing a metal film on one surface of a parallel plane glass with a thickness t of 5 mm, for example. The angles of reflection of each half-mirror 15 in the main- and sub-scanning directions are set by means of a mirror holding mechanist 20 (described later with reference to FIG. 5) in response to horizontal sync and beam position signals that are obtained by detecting one of six (=3×2) laser beams- emitted from the laser 3Ya, 3Ma, 3Ca or 3Ba and the laser 3Yb, ,3Mb, 3Cb or 3Bb, e.g., a laser beam a-1 or b-1 (described in detail later with reference to FIG. 9), by means of the horizontal sync detector 23.

As mentioned before, the laser beams LYa, LMa, LCa and LBa are transmitted through the half-mirrors 15Y, 15M, 15C and 15B, respectively, while the laser beams LYb, LMb, LCb and LBb emitted from the lasers 3Yb, 3Mb, 3Cb and 3Bb are reflected by the half-mirrors 15Y, 15M, 15C and 15B, respectively. The number of light sources 3 (Y, M, C and B) is Nk (k is a positive integer indicative of the number of colors; k=4 in this case), and the number (i) of light sources for each of N1, N2, N3 and N4 is 2. Accordingly, one half-mirror 15 (Y, M, C or B) (=(Ni–1)=2–1) is used for each light source, as mentioned before.

As mentioned before, moreover, the number of times the laser beams L (Ya, Yb, Ma, Mb, Ca, Cb, Ba and Bb) are transmitted through the half-mirrors 15 (Y, M, C and B) is 1 or 0. More specifically, the laser beams LBa, LMa, LCa and LYa are transmitted once through the half-mirrors 15Y, 15M, 15C and 15B, respectively, while the other laser beams LBb, LMb, LCb and LYb are reflected by the half-mirrors 15Y, 15M, 15C and 15B, respectively. The half-mirrors 15 (Y, M, C and B) are inclined in the same direction at the same angle to the laser beams LBa, LMa, LCa and LYa that are directed to the deflector 7 through the half-mirrors 15 (Y, M, C and B), respectively. In this case, the respective angles of inclination (U) of the half-mirrors 15 are adjusted to 45° with the laser beam incidence, each.

By adjusting the ratio between the reflectance and transmittance of each of the half-mirrors 15 (Y, M, C and B) to 1 to 1, the respective outputs of the lasers 3Ya, 3Yb, 3Ma, 3Mb, 3Ca, 3Cb, 3Ba and 3Bb of the light sources 3 (Y, M, C and B) can be set substantially at the same value. Thus, the outputs on focal planes can be made identical, so that the focusing characteristics of the laser beams L (Ya, Yb, Ma, Mb, Ca, Cb, Ba and Bb) can be equalized with ease.

Figure 5:
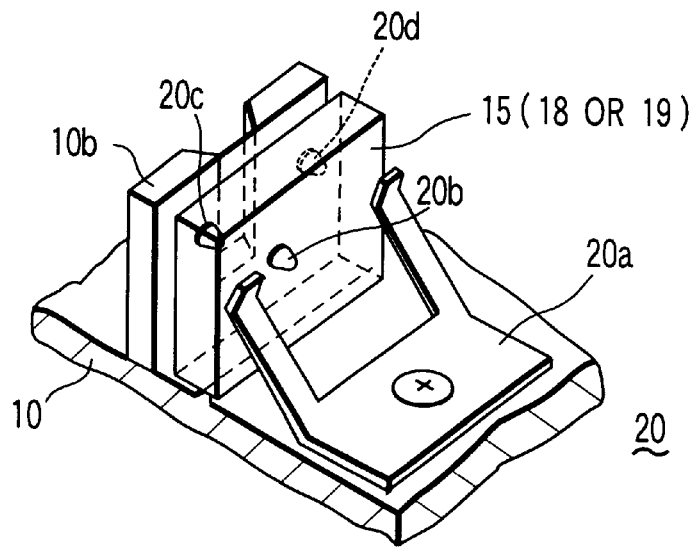
FIG. 5 is a schematic view for illustrating a mechanism for holding a half-mirror, semi-fixed mirror, and color composition mirror in the exposure unit shown in FIGS. 1 and 2.

FIG. 5 is a schematic view showing the mirror holding mechanism 20. The mechanism 20 can adjust the inclinations of the incident and emitting (or reflecting) surfaces of the half-mirrors 15 (Y, M, C and B), which combine the laser 3Ya, 3Ma, 3Ca or 3Ba and the laser 3Yb, 3Mb, 3Cb or 3Bb paired therewith, in directions associated with the main- and sub-scanning directions.

As shown in FIG. 5, the half-mirror 15 is fixed in a predetermined position on the base plate 10, at a desired angle to the optical axis O, by means of a mirror holding portion 10b in the form of a projection integral with the base plate 10 and a leaf spring 20a that can be pressed against the holding portion 10b.

More specifically, the mirror holding mechanism 20 includes a first adjusting screw 20b attached to the bottom portion of the mirror holding portion 10b, on the side near the base plate 10, and second and third adjusting screws 20c and 20d at a predetermined distance from the base plate 10. The inclination of the mirror 15, which is pressed by means of the urging force of the leaf spring 20a, can be adjusted to a desired direction and angle by suitably setting the respective projections of the screws 20b, 20c and 20d. The spring 20a is divided into two belt-shaped regions except for it fixed portion on the base plate 10 so that it can touch only the contour portion of the mirror 15. The mirror holding portion 10b is notched except for the region in which the screws 20b, 20c and 20d are arranged. Thus, laser beams can be incident on or reflected by the mirror 15 from both the sides of the holding portion 10b and the leaf spring 20a.

The cylinder lens 17 is an integral hybrid lens that is composed a plastic lens 17a on the laser side and a glass lens 17b on the deflector side. The plastic lens 17a, which is formed of a plastic material such as polymethyl methacrylate (PMMA), has its profile in the sub-scanning direction in the form of a part of a cylindrical surface. Thus, power in the sub-scanning direction is applied to that surface of the lens 17a which is in contact with air. The glass lens 17b is formed of a glass material such as LAH78. The cylinder lens 17 is obtained by bonding the two lenses 17a and 17b together or pressing them toward a positioning member (not shown) in a predetermined direction. Accordingly, that surface of the plastic cylinder lens 17a which touches the glass lens 17b and that surface of the glass cylinder lens 17b which touches the plastic lens 17a have equal curvatures in the sub-scanning direction. The plastic cylinder lens 17a may be formed integrally on the glass cylinder lens 17b.

The cylinder lenses 17 are fixed in optimized positions in the pre-deflection optical system 5 so that the six laser beams L emitted from the individual light sources 3 are asymmetrically incident at a predetermined distance from the designed optical axes of the lenses 17 and at a predetermined height. These positions are settled so that coma applied to the laser beams L by the first and second focusing lenses 21a and 21b, which constitute the post-deflection optical system 9, can be canceled.

The following is a detailed description of the post-deflection optical system 9, which is situated between the deflector 7, image surfaces, and the laser beams LYa, LYb, LMa, LMb, LCa, LCb, LBa and LBb that are guided and deflected (for scanning) by the reflecting surfaces of the deflector 7.

As the reflecting surfaces of the polygonal mirror body 7a of the deflector 7 rotate, the laser beams Lya (LYa-1, LYa-2 and LYa-3) and LYb (LYb-1, LYb-2 and LYb-3) guided by the deflector 7 are deflected substantially straight, and are applied at a predetermined angle to the incident surface of the first focusing lens 21a of the post-deflection optical system 9.

Thereafter, the laser beams LYa and LYb are given predetermined convergence and directivity by the first and second focusing lenses 21 and 21b so that a beam spot on the surface of a photoconductor drum (not shown) has a predetermined shape and size. Then, the beams LYa and LYb are reflected successively by the mirrors 33Y and 35Y, reflected at a predetermined angle by the mirror 37Y, and applied to the photoconductor drum (image surface, not shown) through the dustproof glass 39Y.

Likewise, the laser beams LMa, LMb, LCa and LCb are passed through the second focusing lens 21b, reflected successively by the mirrors 33M, 33C, 35M and 35C, reflected at a predetermined angle by the mirrors 37M and 37C, and applied to the photoconductor drum (not shown) through the dustproof glasses 39M and 39C.

The laser beams LBa (LBa-1, LBa-2 and LBa-3) and LBb (LBb-1, LBb-2 and LBb-3), like the laser beams corresponding to the aforesaid other colors, are given predetermined convergence and directivity by the first and second focusing lenses 21 and 21b, reflected at a predetermined angle by the mirror 37B only, and applied to the photoconductor drum (not shown) through the dustproof glass 39M.

The third mirrors 37 (Y, M and C), which are arranged corresponding to the laser beams L (Y, M and C), are held by means of a parallelism adjusting mechanism (not shown) so as to be able to reflect the laser beams in desired directions, and are designed so that variations of the beam spot diameter at each end portion of the image surface in the longitudinal direction thereof can be adjusted suitably.

The following is a detail description of the optical properties of the cylinder lenses and the post-deflection optical system.

The first and second focusing lenses 21a and 21b of the post-deflection optical system 9 are formed of a plastic material such as PMMA. It is known, therefore, that the refractive index (n) of the lenses 21a and 21b changes from 1.4876 to 1.4789 as the ambient temperature changes from 0° C. to 50° C., for example. In this case, focusing surfaces on which the laser beams passed through the first and second focusing lenses 21a and 21b are actually converged, that is, focusing positions in the sub-scanning direction, are shifted by about ±4 mm, inevitably.

According to the present invention, on the other hand, the lenses of the same material as the lenses used in the post-deflection optical system 9 are incorporated in the pre-deflection optical system 5 in a manner such that their curvatures are optimized, so that variations of the focusing surfaces that are caused as the refractive index n varies with the temperature change can be restricted to about ±0.5 mm. Thus, as compared with conventional optical systems in which the pre- and post-deflection optical systems 5 and 9 are composed of glass and plastic lenses, respectively, the optical systems according to the invention are designed so that color aberration in the sub-scanning direction, which is caused by the change of the refractive index attributable to the change in temperature of the first and second lenses 21a and 21b of the post-deflection optical system 9, can be corrected.

The correction of the correctable chromatic aberration is settled depending on the power of the plastic cylinder lens 17b, that is, the difference between the respective curvatures of the incident and emitting surfaces of the lens 17b. If the incident surface of the lens 17b is a flat surface, therefore, the curvature of the glass cylinder lens 17a can be specified.

Thus, if the material for the glass cylinder lens 17a is specified, the focal length of the cylinder lens 17 is determined. If the optical properties of the post-deflection optical system 9 are specified, therefore, the minimum beam spot diameter in the sub-scanning direction can be set by means of the focal length of the cylinder lens 17 only. Since this lowers the degree of freedom of design, however, it is necessary to assume that an aimed beam spot cannot be obtained without sacrificing achromatism. The focal length of the cylinder lens 17 may be set by replacing the glass material to change its refractive index, thereby adjusting the focal length of the glass cylinder lens 17a. Depending on the glass material, however, this method is not always helpful to the maintenance of grindability, storage, or transportation, and inevitably involves lowering of the degree of freedom.

From this point of view, independent functions may be assigned to the respective powers of the plastic cylinder lens 17b and the cylinder lens 17 by giving curvatures to the incident and emitting surfaces of the glass cylinder lens 17a. The cost can be minimized, however, by the aforementioned method in which the independent functions are assigned to the respective powers of the plastic cylinder lens 17b and the cylinder lens 17 by giving curvatures to the incident and emitting surfaces of the plastic cylinder lens 17b that are prepared by molding.

TABLES 1 to 3 show the optical properties of the lenses used in the pre-deflection optical system 5 and the post-deflection optical system 9 and the optical members that give predetermined properties to the laser beams. The optical members include the finite-focus lenses 13 (pre-deflection optical system), half-mirrors 15 (pre-deflection optical system), glass and plastic cylinder lenses 17a and 17b (cylinder lenses 17), first and second focusing lenses 21a and 21b (post-deflection optical system), and dustproof glasses 39 (post-deflection optical system). In the pre-deflection optical system, moreover, the elements used for the laser beams LY and the elements used for the laser beams LB are symmetrical with respect to the optical axis O in the sub-scanning direction. In TABLE 2, CUX and CUY represent coefficients obtained when the respective incident and emitting surfaces of the first and second focusing lenses 21a and 21b are given by polynominal expression (1).

TABLE 1

Lens data I

| curvature | thickness | material |
|---|---|---|
| plane | 1 | air |
| plane | 0.3 | BK7 |
| −0.006725 | 12.479 | air |
| −0.078554 | 6.000 | n = 1.7978 |
| −0.0812677 | 0.020 | n = 1.5036 |
| plane | | air | cc = 0.133716000000000
ad = −8.377423603344442D-007
ae = 1.592401449469098D-008
af = 9.787118666580858D-010
ag = −9.475692204982494D-013

TABLE 2

Lens data II absolute coordinate: shift from y axis −4.333

| curvature | | thickness | No. lens surfaces | material |
|---|---|---|---|---|
| CUY | CUZ | | | |
| 0.019021 | −0.0147546 | −35.435 | 1 | air |
| 0.02040817 | 0.01793626 | −6.524 | 2 | PMMA |
| 0.0029042340 | −0.00634328 | −106.530 | 3 | air |
| 0.002112237 | 0.01552636 | −6.0077405 | 4 | PMMA |
| plane | plane | −9.0000 | | air |
| plane | plane | −2.000 | | BK7 |
| plane | plane | −164.000 | | air |

TABLE 3

| n\m | 0 | 1 | 2 | 3 | 4 | 5 | 6 | 7 | 8 | 9 | 10 |
|---|---|---|---|---|---|---|---|---|---|---|---|
| 0 | 0.000E + 00 | -5.075E - 02 | 0.000E + 00 | 3.402E - 05 | -5.413E - 06 | -8.876E - 09 | -3.297E - 10 | 3.380E - 11 | -6.406E - 13 | -1.116E - 14 | 7.120E - 16 |
| 1 | 0.000E + 00 | -5.988E - 06 | 1.407E - 07 | 1.467E - 07 | 1.155E - 08 | -8.891E - 10 | 6.566E - 12 | -5.297E - 13 | 1.169E - 14 | 5.802E - 16 | -1.260E - 17 |
| 2 | -8.696E - 05 | -3.944E - 06 | -4.335E - 07 | 5.183E - 08 | -1.916E - 09 | 4.486E - 11 | 3.950E - 12 | -2.012E - 13 | -4.174E - 17 | -3.424E - 16 | 1.399E - 17 |
| 3 | 1.008E - 05 | 7.221E - 08 | 2.189E - 08 | -1.459E - 09 | 1.338E - 10 | -8.773E - 10 | -1.468E - 12 | 1.466E - 14 | -1.448E - 16 | 2.661E - 17 | -9.120E - 19 |
| 4 | -2.309E - 07 | -1.553E - 10 | -5.827E - 10 | 4.448E - 11 | -9.423E - 13 | 0.000E + 00 | 0.000E + 00 | 0.000E + 00 | 0.000E + 00 | 0.000E + 00 | 0.000E + 00 |
| 0 | 0.000E + 00 | -6.667E - 02 | 0.000E + 00 | 2.044E - 05 | -4.684E - 06 | 7.391E - 09 | -9.888E - 10 | 1.234E - 11 | -2.037E - 13 | -9.521E - 17 | 2.607E - 16 |
| 1 | 0.000E + 00 | -1.127E - 06 | -2.689E - 06 | 1.774E - 07 | -1.558E - 09 | -2.888E - 10 | 2.046E - 11 | -7.927E - 13 | 5.657E - 15 | -3.536E - 16 | 1.618E - 17 |
| 2 | 2.387E - 05 | -4.140E - 06 | -3.284E - 07 | 3.799E - 08 | 2.264E - 12 | 6.067E - 12 | -2.478E - 12 | -6.435E - 14 | 3.198E - 15 | 1.237E - 16 | -3.821E - 18 |
| 3 | -8.930E - 06 | 1.961E - 07 | 1.661E - 08 | -2.529E - 09 | 6.180E - 11 | 2.810E - 11 | -2.949E - 14 | -6.090E - 15 | 6.149E - 17 | 4.649E - 18 | -6.623E - 20 |
| 4 | 2.522E - 07 | -3.095E - 09 | -5.120E - 10 | 4.207E - 11 | -9.508E - 13 | 0.000E + 00 | 0.000E + 00 | 0.000E + 00 | 0.000E + 00 | 0.000E + 00 | 0.000E + 00 |
| 0 | 0.000E + 00 | 1.660E - 02 | 0.000E + 00 | -3.927E - 06 | -2.133E - 07 | 3.818E - 10 | 1.505E - 10 | 2.572E - 14 | -8.037E - 16 | 1.475E - 18 | -1.904E - 20 |
| 1 | 0.000E + 00 | -2.644E - 05 | 5.823E - 07 | -1.140E - 10 | 8.057E - 11 | 1.705E - 11 | -1.613E - 13 | 7.102E - 17 | -8.131E - 19 | 3.084E - 21 | 1.349E - 23 |
| 2 | -8.028E - 06 | -5.092E - 08 | 1.020E - 11 | 1.569E - 11 | -6.288E - 15 | -2.339E - 16 | 1.893E - 17 | -6.265E - 19 | 1.203E - 21 | 3.247E - 23 | -1.577E - 25 |
| 3 | -3.363E - 09 | 1.290E - 10 | 3.133E - 12 | 5.319E - 14 | -8.741E - 17 | -2.001E - 18 | 1.135E - 19 | -3.473E - 22 | 6.745E - 24 | -4.288E - 27 | -5.142E - 29 |
| 4 | 2.025E - 00 | 1.118E - 12 | -8.987E - 15 | -1.688E - 16 | -9.048E - 18 | 0.000E + 00 | 0.000E + 00 | 0.000E + 00 | 0.000E + 00 | 0.000E + 00 | 0.000E +00 |
| 0 | 0.000E + 00 | 1.022E - 02 | 0.000E + 00 | -4.091E - 06 | -4.387E - 08 | 4.082E - 10 | 1.591E - 12 | 9.148E - 16 | 2.739E - 16 | 4.265E - 18 | -7.011E - 20 |
| 1 | 0.000E + 00 | -1.972E - 05 | 3.253E - 07 | -1.081E - 09 | 2.945E - 11 | 2.841E - 11 | -9.708E - 16 | 1.800E - 17 | -1.643E - 18 | 1.058E - 20 | -3.151E - 23 |
| 2 | -8.691E - 06 | -5.126E - 08 | 2.922E - 10 | 4.530E - 11 | -1.610E - 15 | -1.539E - 15 | -3.743E - 18 | -6.221E - 20 | 2.589E - 21 | -1.455E - 23 | -9.009E - 26 |
| 3 | -8.160E - 09 | 4.185E - 11 | 1.9890E - 12 | 4.893E - 14 | 2.992E - 16 | 2.713E - 18 | 7.095E - 20 | -6.659E - 22 | -5.008E - 24 | -4.140E - 26 | 1.614E - 27 |
| 4 | 1.656E - 10 | 1.372E - 12 | 3.2179E - 15 | -1.813E - 16 | -7.667E - 18 | 0.000E + 00 | 0.000E + 00 | 0.000E + 00 | 0.000E + 00 | 0.000E + 00 | 0.000E + 00 |

$$X = \frac{CUYy^2 + CUZz^2}{1 + \sqrt{1 - AYCUY^2y^2 - AZCUZ^2z^2}} + \sum_{n=0}\sum_{m=0} A_{mn} y^m z^{2n} \quad (1)$$

The following is a detailed description of the characteristics of the laser beams (Y, M, C and B) guided from the multi-beam exposure unit 1 to the photoconductor drums (image surfaces, not shown).

The laser beams LYa (LYa-1, LYa-2 and LYa-3) emitted from the first yellow laser 3Ya are converted substantially parallel with respect to the main- and sub-scanning directions by a finite-focus lens 13Ya, and are passed through an aperture stop 14Ya to be given a predetermined sectional beam shape.

The laser beams LYa, thus given the predetermined sectional beam shape, are bent in a predetermined direction to be guided to the half-mirror 15Y by a semi-fixed mirror 18Y, the reflecting surface of which can be set in any desired direction. The mirror 18 is a mirror capable of fine movement whose reflecting surface angle can be set in an optional direction by means of an ultrasonic motor (not shown) or a fixing unit that resembles the mirror holding mechanism 20 previously described with reference to FIG. 5. In order to controller relational positions of each of the laser beams passing through the lenses 17a and 17b, the mirror 18Y (Ni−1=2−1=1) is provided between the aperture stop 14Y and the half mirror 15Y.

The laser beams LYa guided to the half-mirror 15Y are transmitted through the same. Then, they are joined with the laser beams LYb from the second yellow laser 3Yb by the half-mirror 15Y, and the resulting laser beam LY is guided to a cylinder lens 17Y. The laser beam LY guided to the lens 17Y is further converged thereby with respect to the sub-scanning direction and guided to the polygonal mirror body 7a of the deflector 7. The half-mirror 15Y is located so that its angle of reflection in the sub-scanning direction is a predetermined angle to any one of the laser beams LYa, that is, LYa-1, LYa-2 or LYa-3. The angle of inclination of the half-mirror 15Y to the laser beam LYa-1, LYa-2 or LYa-3 in the sub-scanning direction, by which the angle of reflection in the sub-scanning direction is settled, is set according to beam position data (mentioned later) obtained by means of the horizontal sync and sub-scanning beam position detector 23 of the post-deflection optical system 9.

The laser beams LYb (LYb-1, LYb-2 and LYb-3) emitted from the second yellow laser 3Yb are converted substantially parallel with respect to the main- and sub-scanning directions by a finite-focus lens 13Yb, and are passed through an aperture stop 14Yb to be given a predetermined sectional beam shape. The laser beams LYb, thus given the predetermined sectional beam shape, are reflected by the half-mirror 15Y, joined with the laser beams LYa from the first yellow laser 3Ya by the half-mirror 15Y, and guided to the polygonal mirror body 7a of the deflector 7.

The laser beams LMa (LMa-1, LMa-2 and LMa-3) emitted from the first magenta laser 3Ma are converted substantially parallel with respect to the main- and sub-scanning directions by a finite-focus lens 13Ma, and are passed through an aperture stop 14Ma to be given a predetermined sectional beam shape. The laser beams LMa, thus given the predetermined sectional beam shape, are guided to the half-mirror 15M. The laser beams LMa guided to the half-mirror 15M are transmitted through the same. Then, they are joined with the laser beams LMb from the second magenta laser 3Mb by the half-mirror 15M, and the resulting laser beam LM is guided to a cylinder lens 17M. The laser beam LM guided to the lens 17M is further converged thereby with respect to the sub-scanning direction and guided to the polygonal mirror body 7a of the deflector 7. The half-mirror 15M is located so that its angle of reflection in the sub-scanning direction is a predetermined angle to any one of the laser beams LMa, that is, LMa-1, LMa-2 or LMa-3. The angle of inclination of the half-mirror 15M to the laser beam LMa-1, LMa-2 or LMa-3 in the sub-scanning direction, by which the angle of reflection in the sub-scanning direction is settled, is set according to beam position data (mentioned later) obtained by means of the horizontal sync and sub-scanning beam position detector 23 of the post-deflection optical system 9.

The laser beams LMb (LMb-1, LMb-2 and LMb-3) emitted from the second magenta laser 3Mb are converted substantially parallel with respect to the main- and sub-scanning directions by a finite-focus lens 13Mb, and are passed through an aperture stop 14Mb to be given a predetermined sectional beam shape. The laser beams LMb, thus given the predetermined sectional beam shape, are reflected by the half-mirror 15M, joined with the laser beams LMa from the first magenta laser 3Ma by the half-mirror 15M, and guided to the polygonal mirror body 7a of the deflector 7.

The laser beams LCa (LCa-1, LCa-2 and LCa-3) emitted from the first cyan laser 3Ca are converted substantially parallel with respect to the main- and sub-scanning directions by a finite-focus lens 13Ca, and are passed through an aperture stop 14Ca to be given a predetermined sectional beam shape. The laser beams LCa, thus given the predetermined sectional beam shape, are guided to the half-mirror 15C. The laser beams LCa guided to the half-mirror 15C are transmitted through the same. Then, they are joined with the laser beams LCb from the second cyan laser 3Cb by the half-mirror 15C, and the resulting laser beam LC is guided to a cylinder lens 17C. The laser beam LC guided to the lens 17C is further converged thereby with respect to the sub-scanning direction and guided to the polygonal mirror body 7a of the deflector 7. The half-mirror 15C is located so that its angle of reflection in the sub-scanning direction is a predetermined angle to any one of the laser beams LCa, that is, LCa-1, LCa-2 or LCa-3. The angle of inclination of the half-mirror 15C to the laser beam LCa-1, LCa-2 or LCa-3 in the sub-scanning direction, by which the angle of reflection in the sub-scanning direction is settled, is set according to beam position data (mentioned later) obtained by means of the horizontal sync and sub-scanning beam position detector 23 of the post-deflection optical system 9.

The laser beams LCb (LCb-1, LCb-2 and LCb-3) emitted from the second cyan laser 3Cb are converted substantially parallel with respect to the main- and sub-scanning directions by a finite-focus lens 13Cb, and are passed through an aperture stop 14Cb to be given a predetermined sectional beam shape. The laser beams LCb, thus given the predetermined sectional beam shape, are reflected by the half-mirror 15C, joined with the laser beams LCa from the first cyan laser 3Ca by the half-mirror 15C, and guided to the polygonal mirror body 7a of the deflector 7.

The laser beams LBa (LBa-1, LBa-2 and LBa-3) emitted from the first black laser 3Ba are converted substantially parallel with respect to the main- and sub-scanning directions by a finite-focus lens 13Ba, and are passed through an aperture stop 14Ba to be given a predetermined sectional beam shape. The laser beams LBa, thus given the predetermined sectional beam shape, are bent in a predetermined direction to be guided to the half-mirror 15B by a semi-fixed mirror 18B (likewise 18Y), the reflecting surface of which can be set in any desired direction.

The laser beams LBa guided to the half-mirror 15B are transmitted through the same. Then, they are joined with the laser beams LBb from the second black laser 3Bb by the half-mirror 15B and guided to a cylinder lens 17B. The resulting laser beam LB guided to the lens 17B is further converged thereby with respect to the sub-scanning direction and guided to the polygonal mirror body 7a of the deflector 7. The half-mirror 15B is located so that its angle of reflection in the sub-scanning direction is a predetermined angle to any one of the laser beams LBa, that is, LBa-1, Lba-2 or LBa-3. The angle of inclination of the half-mirror 15B to the laser beam LBa-1, LBa-2 or LBa-3 in the sub-scanning direction, by which the angle of reflection in the sub-scanning direction is settled, is set according to beam position data (mentioned later) obtained by means of the horizontal sync and sub-scanning beam position detector 23 of the post-deflection optical system 9.

The laser beams LBb (LBb-1, LBb-2 and LBb-3) emitted from the second black laser 3Bb are converted substantially parallel with respect to the main- and sub-scannin.g directions by a finite-focus lens 13Bb, and are passed through an aperture stop 14Bb to be given a predetermined sectional beam shape. The laser beams LBb, thus given the predetermined sectional beam shape, are reflected by the half-mirror 15B, joined with the laser beams LBa from the first black laser 3Ba by the half-mirror 15B, and guided to the polygonal mirror body 7a of the deflector 7.

The semi-fixed mirrors 18Y and 18B, which are situated on the respective optical axes of the laser beams LYa and LBa emitted from the first yellow and black lasers 3Ya and 3Ba, respectively, are arranged so that the directions and angles of the laser beams can be changed with respect to the main- and sub-scanning directions by means of a mirror holding mechanism that resembles the mirror holding mechanism 20 of FIG. 5 for holding the half-mirror 15, for example.

The six (=3×2) laser beams LM, LC and LB collected by means of the half-mirrors 15M, 15C and 15B are turned in predetermined directions to be guided to the deflector 7 by means of the color composition mirrors (second composition mirrors) 19M, 19C and 19B, which correspond to the laser beams L(M, C and B), respectively. Like the half-mirrors 15 (Y, M, C and B) and the semi-fixed mirrors 18Y and 18B, the composition mirrors 19M,19C and 19B are arranged so that the directions and angles of the laser beams can be changed with respect to the main- and sub-scanning directions by means of a mirror holding mechanism that resembles the mirror holding mechanism 20 of FIG. 5 for holding the half-mirror 15.

The six laser beams LY collected by the half-mirror 15Y are guided straight toward the deflector 7 without being turned halfway. More specifically, the laser beams LY are guided to the deflector 7 through a space that is kept at distances from the color composition mirrors 19M, 19C and 19B, in the rotating direction of the polygonal mirror body 7a of the deflector 7, and cannot be screened by any of the mirrors.

The following is a description of adjustment of beam positions on the image surfaces by means of the lens holder 11.

Figure 6:
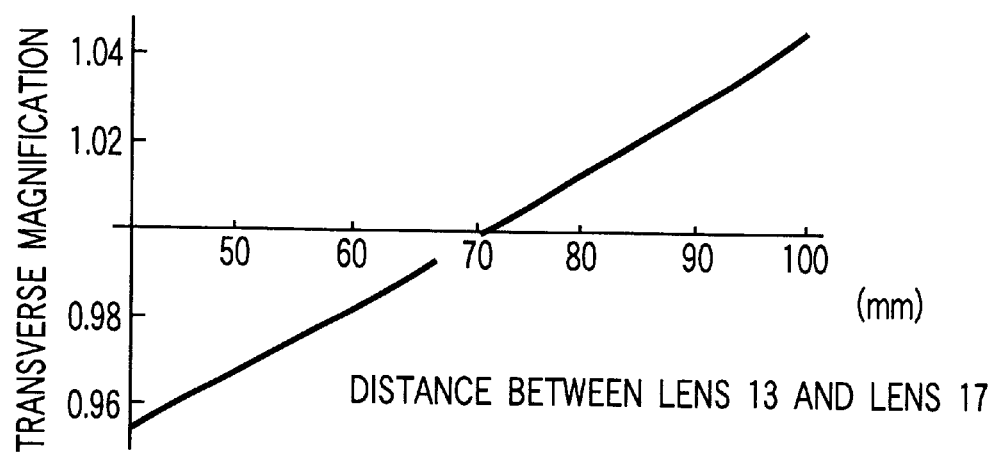
FIG. 6 is a graph showing a relation with a distance between each finite-focus lens and its corresponding cylinder lens and the transverse magnification on an image surface in a sub-scanning direction, in the exposure unit shown in FIGS. 1 and 2.
Figure 7:
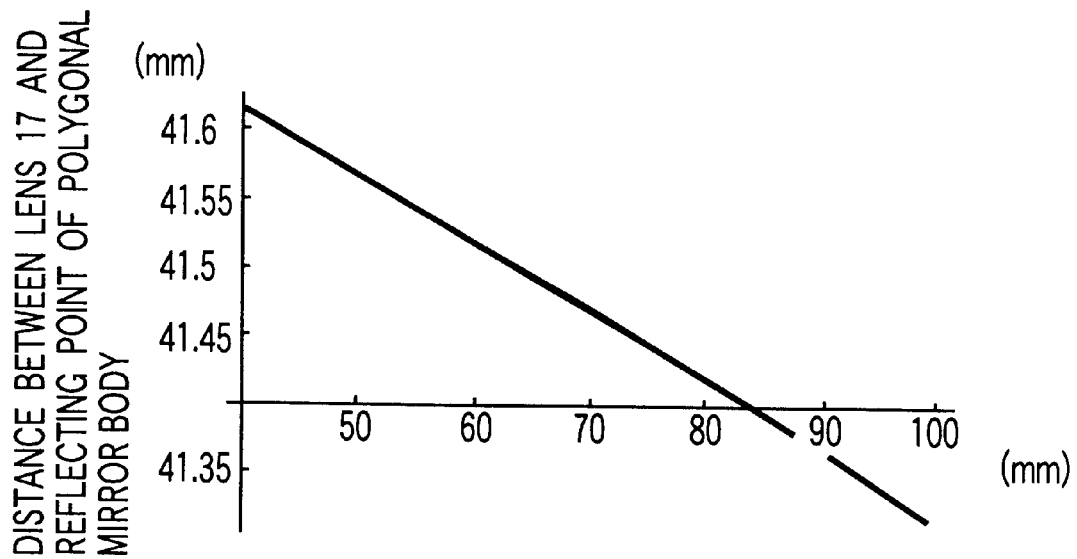
FIG. 7 is a graph showing the relation between the distance between each finite-focus lens and its corresponding cylinder lens and a distance between each cylinder lens is just-in-focused in the sub-scanning direction and a reflecting point on each polygonal mirror body of a deflector, in the exposure unit shown in FIGS. 1 and 2.

FIGS. 6 and 7 are graphs showing a relation with the distance between each finite-focus lens 13 and its corresponding cylinder lens 17 of the pre-deflection optical system 5 and the transverse magnification on the outer peripheral surface (image surface) of each photoconductor drum (not shown) in the sub-scanning direction and the relation between the distance between the lenses 13 and 17 and the distance between each cylinder lens 17 is just-in-focused in the sub-scanning direction and a reflecting point on each reflecting surface of the deflector 7, respectively, in order to controller positions of beam spots controlled by rotation of lens holder 11.

Since the finite-focus lens 13 is movable along the optical axis O by using the lens holder 11 (see FIG. 3), as shown in FIGS. 6 and 7, the six (3×2) laser beams from the lasers 3Ya, 3Yb, 3Ma, 3Mb, 3Ca, 3Cb, 3Ba and 3Bb can be condensed at predetermined intervals by means of the half-mirrors 15, and the laser beams for the four color components can be accurately guided en bloc to the reflecting point on each reflecting surface of the polygonal mirror body 7a of the deflector 7.

As shown in FIG. 8, each of the lasers 3Ya, 3Yb, 3Ma, 3Mb, 3Ca, 3Cb, 3Ba and 3Bb is a laser array having three light-emitting points that are arranged substantially in the shape of an equilateral triangle. A laser beam L emitted from any of the laser arrays is guided, in the form of three dots (beam spots corresponding to information to be recorded) a-1, a-2 and a-3 or b1, b-2 and b-3, to its corresponding photoconductor drum. More specifically, the number m of the light-emitting points of each laser array is m=3. Since $n_1$ is 2 covering 3Ya and 3Yb, $n_2$ is 2 covering 3Ma and 3Mb, $n_3$ is 2 covering 3Ca and 3Cb, and $n_4$ is $n_k$ that equals 2 covering 3Ba and 3Bb.

In other words, the number of light-emitting points provided by all the laser arrays is equal to the product (m×n) of m (integer not smaller than 3) and n or $(n_1+n_2+ \ldots n_k)$ ($n_1$, $n_2 \ldots n_k$ are integers not smaller than 1).

The laser beams L emitted from the individual light-emitting points are arranged at distances such that the respective outer peripheral edges of their beam spots slightly overlap one another or the beam spots can continuously eliminate electric charges on their corresponding image surfaces (outer peripheral surfaces of the photoconductor drums) when the dots a-1 and b-1, a-2 and b-2, and a-3 and b-3 are caused to reach the outer peripheral surfaces of the drums (not shown) by the half-mirrors 15. As this is done, the laser beams are arranged at distances by the half-mirrors 15 such that the respective outer peripheral edges of the beam spots of the dots b-1 and a-2 and the dots b-2 and a-3 slightly overlap one another or the beam spots can continuously eliminate electric charges on their corresponding image surfaces.

Whether the outer peripheral edges of the beam spots slightly overlap one another or whether the beam spots are enabled continuously to eliminate electric charges on their corresponding photoconductor drums (not shown) is determined by adjusting a space δ between the dots b-1 and a-2 or between the dots b-2 and a-3 to a predetermined value. If this is done, various of distance of the beam spots in the sub-scanning direction attributable to the laser beams L guided to the photoconductor drums (image surfaces) can be reduced by means of the six (3×2) laser beams that are deflected once (for scanning) by each reflecting surface of the polygonal mirror body 7a of the deflector 7.

Figure 9:
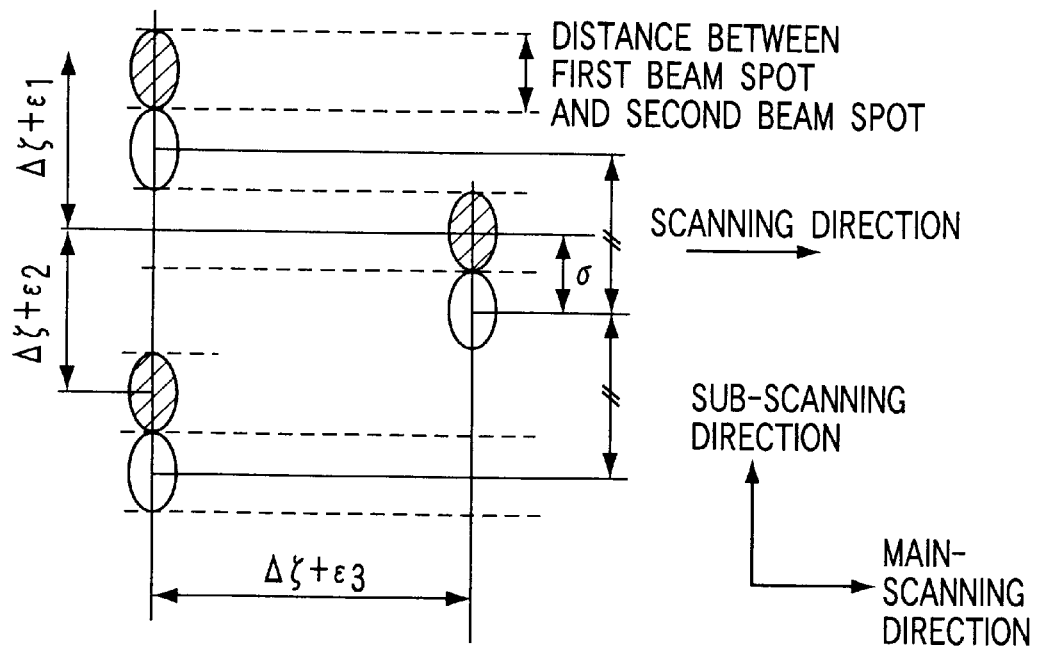
FIG. 9 is a schematic view for illustrating an arrangement of laser beam spots on an image surface obtained with use of two semiconductor laser elements shown in FIG. 8.

The spaces δ are able to control by inclination of the semi-fixed mirrors 18Y and 18B inclined by the ultrasonic motor. Thus, the three light-emitting points of each of the lasers 3Ya, 3Yb, 3Ma, 3Mb, 3Ca, 3Cb, 3Ba and 3Bb can provide n number of dot spaces on the photoconductor drums (image surfaces), as shown in FIG. 9.

Figure 10:
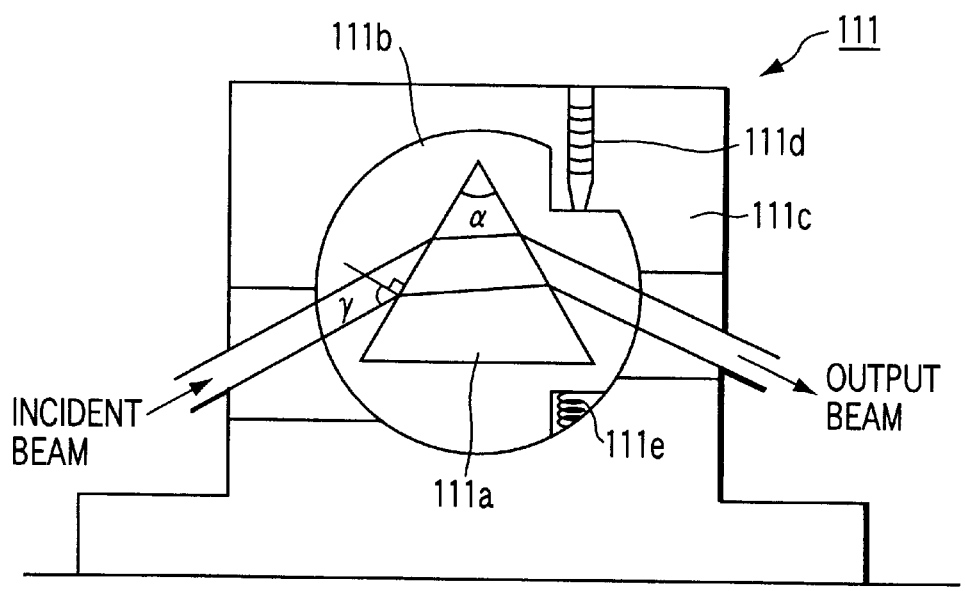
FIG. 10 is a schematic view showing an example of a transverse magnification of the sub-scanning direction adjusting mechanism capable of providing the beam spots arranged in the manner shown in FIG. 9, in the exposure unit shown in FIGS. 1 and 2.

FIG. 10 is a schematic view for illustrating a transverse magnification of the image surface in the sub-scanning direction adjusting mechanism that can change the space δ between each laser beams.

As shown in FIG. 10, a beam space adjusting mechanism 111 (for any one of the laser beams L) includes a prism 111a with a vertical angle α, a prism holder 111b for holding the prism 111a for rotation, and a housing 111c that allows the holder 111b to rotate for a predetermined angle. The mechanism 111 further includes a setscrew 111d for fixing the holder 111b at any desired angle to the optical axis O in conjunction with the housing 111c and a spring 111e for applying repulsive force in the direction opposite to the direction of rotatory force that is applied to housing 111c by the setscrew 111d. The prism 111a can rotate around an axis that extends at right angles to the optical axis O corresponding to each of the laser beams L (Y, M, C and B), which are defined between the deflector 7 and the lasers 3Ya, 3Yb, 3Ma, 3Mb, 3Ca, 3Cb, 3Ba and 3Bb, and is at the same sub-scanning-direction height as the optical axis O in the direction perpendicular to both the optical axis O and the extending direction of the adjusting mechanism 111, that is, within a plane that contains the optical axis O and a sub-scanning cross section.

The angle (γ) of incidence of the laser beam L on the incident surface of the prism 111a is changed by rotating the prism 111a. By doing this, the space between the laser beams b-1, b-2 and b-3 each and between the laser beams a-1, a-2 and a-3 each, which are provided with same by the laser beams a-1 (b-1), a-2 (b-2) and a-3 (b-3) from the three light-emitting points of each laser a (or b), can be adjusted to an optimum value.

The transverse magnification of the image surface in the sub-scanning direction adjusting mechanisms 111 shown in FIG. 10 are located between the half-mirrors 15 (Y, M, C and B) and lens holders 11 (Ya, Ma, Ca and Ba) and 11 (Yb, Mb, Cb and Bb) for holding the laser beams 3 (Ya, Ma, Ca and Ba) and 3 (Yb, Mb, Cb and Bb), individually, as viewed in the plane of FIG. 1.

The following is a description of the principle of adjustment of the transverse magnification of the image surface in the sub-scanning direction adjusting mechanism 111 shown in FIG. 10 for the spaces on each photoconductor drum (image surface) between the three laser beams L emitted from a laser element a or b that includes the three light-emitting points shown in FIG. 8. It is to be understood that this description also applies to the laser beams from any other laser elements.

Figure 11A:
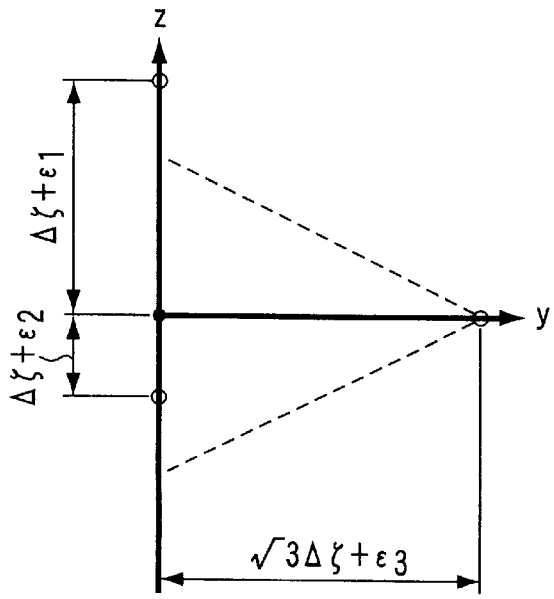
FIGS. 11A, 11B and 11C are schematic views showing varied arrangements of the beam spots provided by the transverse magnification of the sub-scanning direction adjusting mechanism shown in FIG. 10.
Figure 11B:
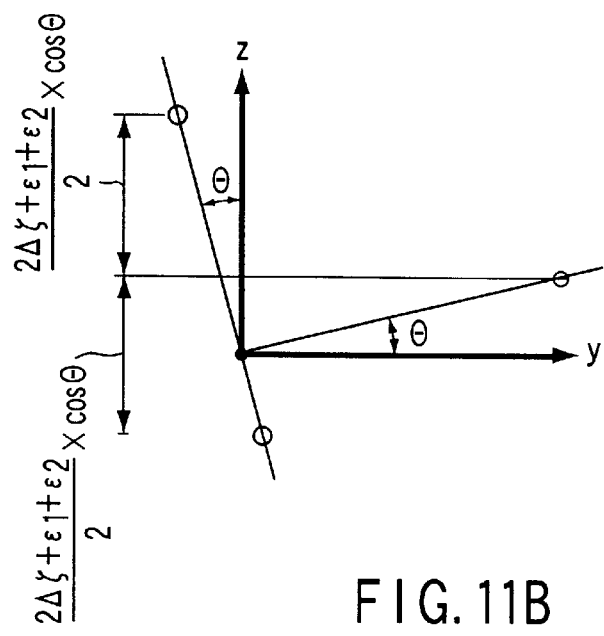

If the beam spots of the three laser beams emitted individually from the three light-emitting points of the laser element are *-1, *-2 and *-3 (* indicates a or b), respectively, there may be spaces $(\delta\zeta+\epsilon_1)$ and $(\delta\zeta+\epsilon_2)$ in the sub-scanning direction between the beam spot *-2 and the beam spots *-1 and *-3, and there may be a space $(\sqrt{3}\Delta\zeta+\zeta_3)$ in the main-scanning direction between the beam spot *-2 and a segment that connects the beam spots *-1 and *-3. Thereupon, for example, if the laser 3 Mb is rotated and the relational beam positions on the image surface are rotated for an angle θ, the spaces between the beam spot *-2 and the beam spots *-1 and *-3 are given by $$*\text{-}1=\{(2\Delta\zeta+\epsilon_1+\epsilon_2)/2\}\cos\theta,$$

$$*\text{-}3=\{(2\Delta\zeta+\epsilon_1+\epsilon_2)/2\}\cos\theta,$$

as shown in FIG. 11B.
If the angle θ is given by $$\theta=\tan^{-1}\{(2\Delta\zeta+\epsilon_1+\epsilon_2)/2(\sqrt{3}\Delta\zeta+\epsilon_3)\},$$

the distance between the beam spots *-2 and *-1 and the distance between the beam spots *-2 and *-3 are equal. Δζ is Δζ=0.0067064 mm.

Next, the beam spaces δ are able to control in predetermined spaces controlled by transverse magnification of the image surface in the sub-scanning direction with the rotation of the prism 111 or the movement of the lens holder 11.

Figure 11C:
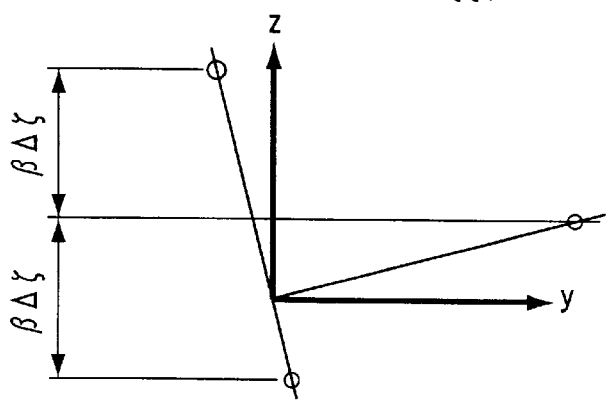

If an adjustable range β' for a transverse magnification β in the sub-scanning direction is adjusted as $$\beta'=\beta/[1+\{(\epsilon_1+\epsilon_2)/2\Delta\zeta\}\cos\theta],$$

the distances between the beam spots in the sub-scanning direction are βΔζ, as shown in FIG. 11C.

Figure 12:
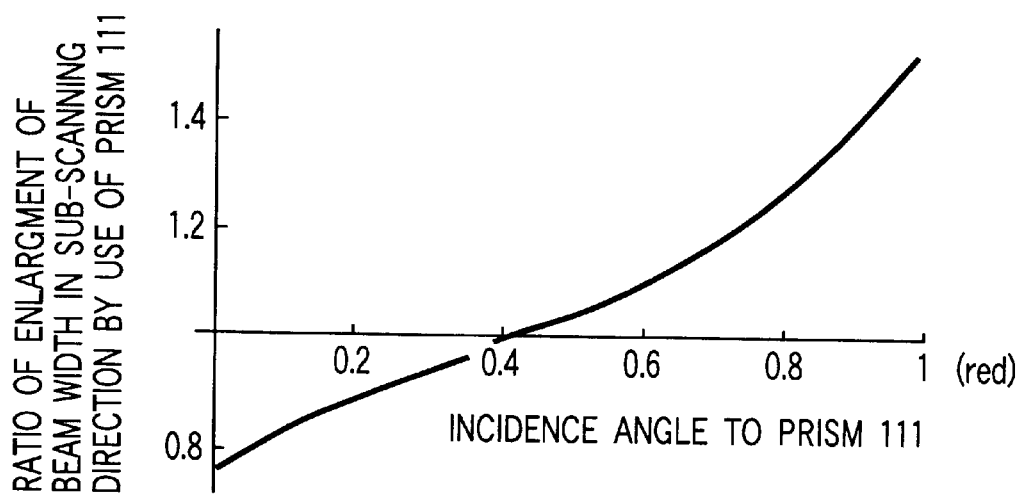
FIG. 12 is a graph showing a relation between an angle of an incidence laser beam to a prism in the transverse magnification of the sub-scanning direction adjusting mechanism shown in FIG. 10 and a ratio of an enlargement of a beam width (beam spot size) in the sub-scanning direction (by use of the prism)

FIG. 12 shows a characteristic curve representing the relation between the angles of incidence of the laser beams on the prism 111a and a ratio of enlargement of beam width in the sub-scanning direction by use of the prism 111a with a vertical angle α of the prism 111a given by α=π/6.

Figure 13:
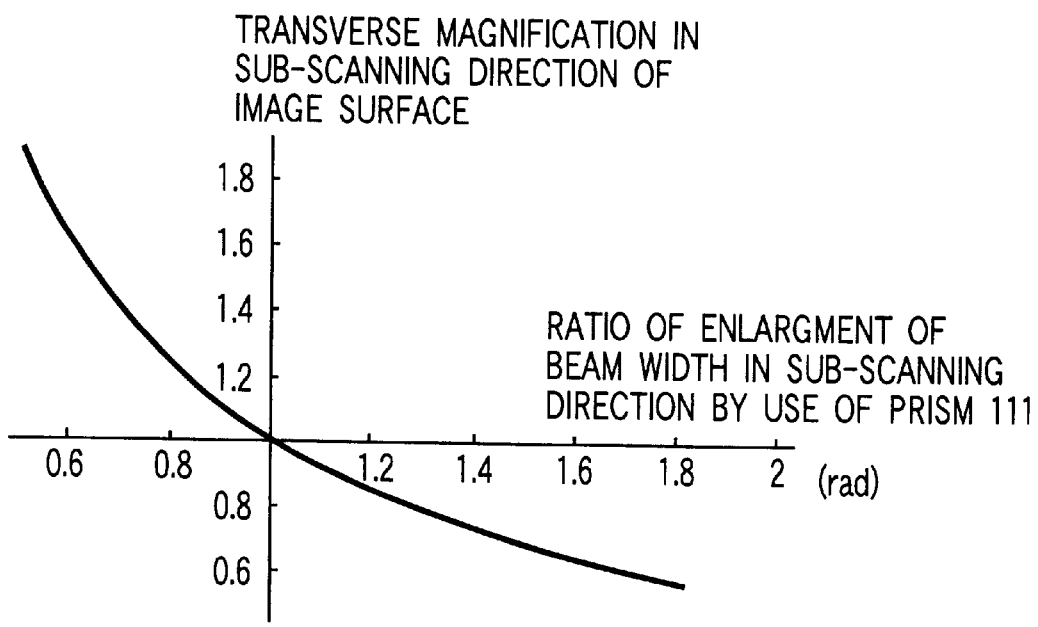
FIG. 13 is a graph showing a relation between a ratio of the enlargement of the beam width in the sub-scanning direction by use of the prism housed in the transverse magnification of the sub-scanning adjusting mechanism shown in FIG. 10 and the transverse magnification of an image surface in the sub-scanning direction.

FIG. 13 is a graph showing the relation between the transverse magnification of the image surface in the sub-scanning direction provided with the prism 111a of the beam position adjusting mechanism 111 shown in FIG. 10 and the transverse magnification in the sub-scanning direction.

Figure 14:
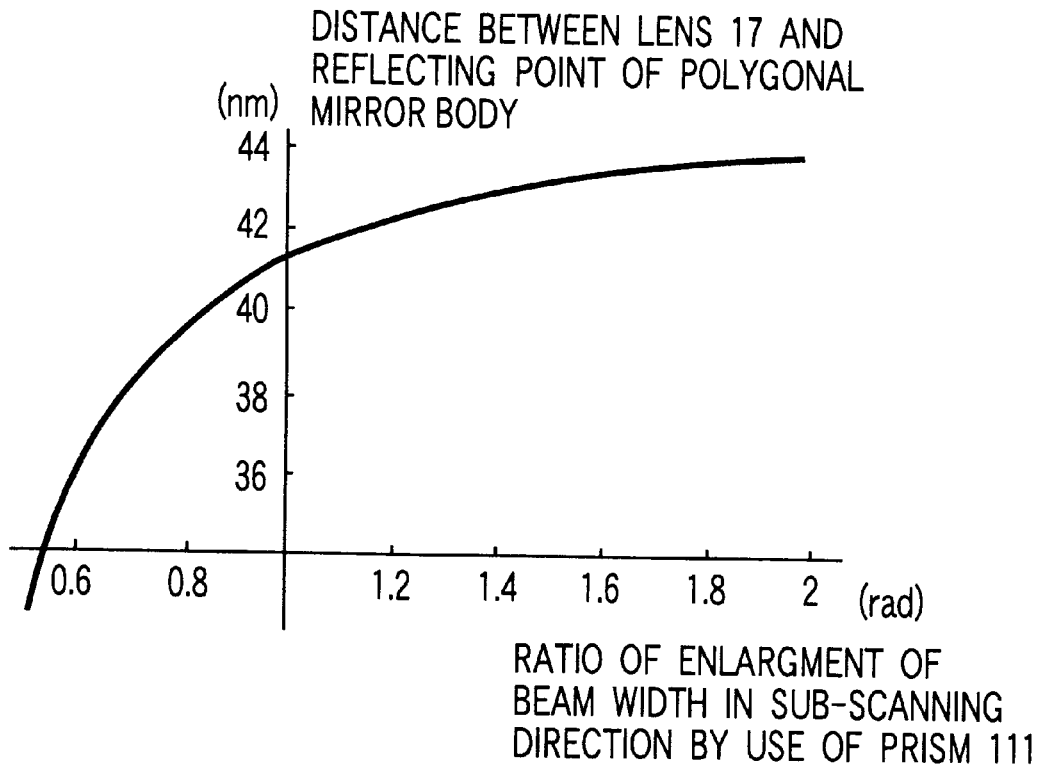
FIG. 14 is a graph showing a relation between a ratio of the enlargement of the beam width in the sub-scanning direction by use of the prism housed in the transverse magnification of the sub-scanning adjusting mechanism shown in FIG. 10 and a distance between each cylinder lens which is just-in-focused in the sub-scanning direction, and a reflecting point on each reflecting surface of the deflector.

As seen from FIG. 13, the transverse magnification of the image surface in the sub-scanning direction can be adjusted by rotating the transverse magnification of the image surface in the sub-scanning direction adjusting mechanism 111 shown in FIG. 10 for a predetermined angle. There may be a case in which the transverse magnification is adjusted by using the adjusting mechanism 111 need to focus adjustment must be made by moving the cylinder lens 17 in the subsequent stage along the optical axis O. As shown in FIG. 14, the distance between each cylinder lens 17 and the reflecting point on each reflecting surface of the deflector 7 and the transverse magnification provided by the prism 111a are in the ratio of one to one. Thus, any desired transverse magnification can be provided by adjusting the focus of each cylinder lens 17.

Figure 15:
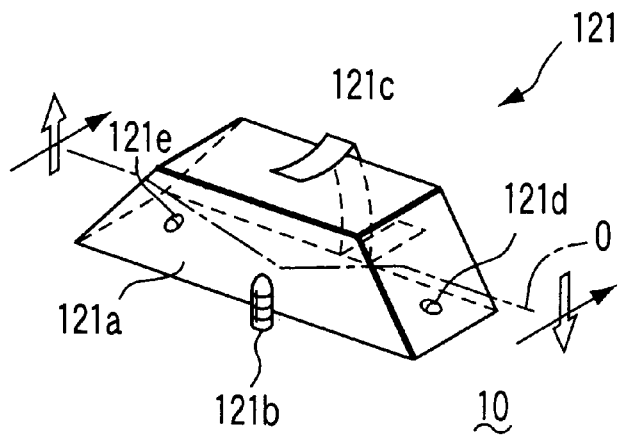
FIG. 15 is a schematic view for illustrating another example of the transverse magnification of the sub-scanning direction adjusting mechanism shown in FIG. 10.

FIG. 15 is a schematic view for illustrating another example of the transverse magnification of the image surface in the sub-scanning direction adjusting mechanism shown in FIG. 10.

Referring to FIG. 15, a transverse magnification of the image surface in the sub-scanning direction adjusting mechanism 121 (for any one of the laser beams L) includes a dove prism 121a, a positioning pin 121b for fixing the prism 121a in a predetermined position on the base plate 10, a leaf spring 121c for pressing the prism 121a against the pin 121b, and adjusting screws 121d and 121e protruding from the plate 10 so that their projections toward the prism 121a are adjustable. The prism 121a is located along the optical axis O corresponding to each of the laser beams L (Y, M, C and B), which are defined between the deflector 7 and the lasers 3Ya, 3Yb, 3Ma, 3Mb, 3Ca, 3Cb, 3Ba and 3Bb.

By rotating the dove prism 121a in the lengthwise direction (around the optical axis O) by means of the first and second adjusting screws 121d and 121e, the laser beams can be inclined at an angle twice the angle of rotation. Since a cosine of the rotational angle causes the transverse magnification to change in the sub-scanning direction, the focuses of the cylinder lenses need not be adjusted.

As described above, a multi-beam exposure unit according to the present invention comprises: first optical means including n (integer not smaller than 2) number of light sources each having m (integer not smaller than 2) number of light-emitting points and capable of providing a plurality of light beams, the space between each two adjacent light beams being equivalent to n number of dots on an image surface with respect to a sub-scanning direction, n number of first beam spaces controlling mechanisms for collectively adjusting the spaces between the (m×n) number of light beams in the sub-scanning direction on the image surface for each m number of beams, at least (n−1) number of second beam spaces controlling mechanisms for collectively adjusting the positions of the m number of light beams on the image surface, and (n−1) number of first composition mirrors adapted to transmit a predetermined percentage of the light beams and reflect the remaining percentage, whereby the (m×n) number of light beams are put together into one luminous flux passing substantially through one and the same optical path; deflecting means having a rotatable reflecting surface such that the light beams from the first optical means can be deflected in predetermined directions by rotating the reflecting surface at a predetermined speed; and second optical means for continuously focusing the (m×n) number of light beams, deflected by the deflecting means, on the image surface. Thus, (m×n) number of images can be provided by one cycle of exposure (deflection).

Further, a multi-beam exposure unit according to the invention comprises: first optical means including light sources each having light-emitting points located in the individual vertex positions of a triangle defined by m=3 and mechanisms for collectively adjusting the sub-scanning-direction spaces between light beams from the light sources on an image surface; deflecting means having a rotatable reflecting surface such that the light beams from the first optical means can be deflected in predetermined directions by rotating the reflecting surface at a predetermined speed; and second optical means for continuously focusing the m number of light beams, deflected by the deflecting means, on the image surface. Thus, the sub-scanning-direction spaces between the three light beams can be made substantially equal.

Moreover, a multi-beam exposure unit according to the invention comprises: first optical means including ($n_1+n_2+ \ldots n_k$) number of light sources ($n_1, n_2 \ldots n_k$ and k are integers not smaller than 1) each having m (integer not smaller than 2) number of light-emitting points and capable of providing (m×($n_1+n_2+ \ldots n_k$)) number of light beams, mechanisms for collectively adjusting the sub-scanning-direction spaces between the light beams from the light sources on an image surface for each group of light sources, the adjusting mechanisms being provided individually for the groups of light sources, and (k−1) number of second composition mirrors for putting the (m×($n_1+n_2 + \ldots n_k$)) number of light beams together into one luminous flux passing substantially through one and the same optical path in the main scanning direction; deflecting means having a rotatable reflecting surface such that the light beams from the first optical means can be deflected in predetermined directions by rotating the reflecting surface at a predetermined speed; and second optical means for continuously focusing the (m×($n_1+n_2+ \ldots n_k$)) number of light beams, deflected by the deflecting means, on the image surface. Thus, the properties and relative positions of light beams can be kept fixed by collectively deflecting the k number of groups of light beams.

Furthermore, a multi-beam exposure unit according to the invention comprises: first optical means including light sources each having n (integer not smaller than 2) number of groups of light-emitting points located in the individual vertex positions of a triangle defined by m=3 and capable of providing (m×n) number of light beams having n number of dot spaces in a sub-scanning direction on an image surface, n number of mechanisms for collectively adjusting the sub-scanning-direction spaces between the 3n number of light beams from the light sources on the image surface for each m number of beams, at least (n−1) number of mechanisms for collectively adjusting the positions of the light beams from the light sources on the image surface for each m number of light beams, and (n−1) number of first composition mirrors adapted to transmit a predetermined percentage of the light beams and reflect the remaining percentage, whereby the 3n number of light beams are put together into one luminous flux passing substantially through one and the same optical path; deflecting means having a rotatable reflecting surface such that the light beams from the first optical means can be deflected in predetermined directions by rotating the reflecting surface at a predetermined speed; and second optical means for continuously focusing the 3n number of light beams, deflected by the deflecting means, on the image surface. Thus, the (m×n) number of light beams can be collectively deflected (for scanning) by means of only one deflector.

Further, a multi-beam exposure unit according to the invention comprises: first optical means including ($n_1+n_2+ \ldots n_k$) number of light sources ($n_1, n_2 \ldots n_k$ and k are integers not smaller than 1) each having m (integer not smaller than 2) number of light-emitting points and capable of providing (m×($n_1+n_2+ \ldots n_k$)) number of light beams such that images of the m number of light-emitting points are arranged at spaces corresponding to ($n_1+n_2+ \ldots n_k$) number of dots on an image surface, mechanisms for collectively adjusting the sub-scanning-direction spaces between the light beams from the light sources on the image surface for each group of light sources, the beam space adjusting mechanisms being provided individually for the groups of light sources, at least ($n_1+n_2+ \ldots n_{k-k}$) number of mechanisms for collectively adjusting the positions of the m number of light beams on the image surface, and (k−1) number of second composition mirrors for putting the (m×($n_1+n_2+ \ldots n_k$)) number of light beams together into one luminous flux passing substantially through one and the same optical path in the main scanning direction; deflecting means having a rotatable reflecting surface such that the light beams from the first optical means can be deflected in predetermined directions by rotating the reflecting surface at a predetermined speed; and second optical means for continuously focusing the (m×($n_1+n_2+ \ldots n_k$)) number of light beams, deflected by the deflecting means, on the image surface. Thus, the sub-scanning-direction spaces between the (m×($n_1+n_2+ \ldots n_k$)) number of light beams can be set for the individual light beams.

Furthermore, a multi-beam exposure unit according to the invention comprises: first optical means including light sources each having ($n_1+n_2+ \ldots n_k$) number of light-emitting points ($n_1, n_2 \ldots n_k$ and k are integers not smaller than 1) located in the individual vertex positions of a triangle defined by m=3, mechanisms for collectively adjusting the sub-scanning-direction spaces between the (m×($n_1+n_2+ \ldots n_k$)) number of light beams on the image surface for each m number of beams, and (k−1) number of second composition mirrors for putting the (m×($n_1+n_2+ \ldots n_k$)) number of light beams together into one luminous flux passing substantially through one and the same optical path in the main scanning direction; deflecting means having a rotatable reflecting surface such that the light beams from the first optical means can be deflected in predetermined directions by rotating the reflecting surface at a predetermined speed; and second optical means for continuously focusing the $(m \times (n_1+n_2+ \ldots n_k))$ number of light beams, deflected by the deflecting means, on the image surface. Thus, the sub-scanning-direction spaces between the $((m \times (n_1+n_2+ \ldots n_k))$ number of light beams can be set for the individual light beams.

Further, a multi-beam exposure unit according to the invention comprises: first optical means including light sources each having $(n_1+n_2+ \ldots n_k)$ number of light-emitting points ($n_1, n_2 \ldots n_k$ are integers not smaller than 2 and k is an integer not smaller than 1) located in the individual vertex positions of a triangle defined by m=3, mechanisms for collectively adjusting the sub-scanning-direction spaces between the light beams from the light sources on the image surface for each group of light sources for each m number of beams, the beam space adjusting mechanisms being provided individually for the groups of light sources, $(n_1+n_2+ \ldots n_k-k)$ number of first composition mirrors adapted to transmit a predetermined percentage of the incident light beams and reflect the remaining percentage, and $(k-1)$ number of second composition mirrors for putting the $(m \times (n_1+n_2+ \ldots n_k))$ number of light beams together into one luminous flux passing substantially through one and the same optical path in the main scanning direction; deflecting means having a rotatable reflecting surface such that the light beams from the first optical means can be deflected in predetermined directions by rotating the reflecting surface at a predetermined speed; and second optical means for continuously focusing the $(m \times (n_1+n_2+ \ldots n_k))$ number of light beams, deflected by the deflecting means, on the image surface. Thus, the sub-scanning-direction spaces between the $((m \times (n_1+n_2+ \ldots n_k))$ number of light beams can be set for the individual light beams.

In the multi-beam exposure unit according to the invention, moreover, each mechanism for collectively adjusting the sub-scanning-direction spaces between the laser beams is a prisms that is rotatable around the point of intersection of an optical axis, which connects each light source and the deflector, and the center of the sub-scanning-direction image height, in a sub-scanning cross section along the optical axis. Thus, the sub-scanning-direction spaces between the light beams can be made uniform without being influenced by shifts of respective optical axes of the individual optical elements.

Furthermore, the maximum beam space for the $(m \times n)$ number of light beams emitted from the light sources of the multi-beam exposure unit according to the invention is equivalent to a scanning pitch of $(n \times m - 1)$, so that it cannot be easily influenced by jitters, and therefore, fluctuations of the light beams on the image surface can be reduced.

Thus, there may be provided an image forming apparatus capable of high-speed image formation.

Further, there may be provided a color image forming apparatus capable of producing color images that are free from color shifts.

Since the apparatus uses only one deflector, moreover, its size can be reduced.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A multi-beam exposure unit comprising:
    deflecting means for deflecting light beams in a first direction by rotating a rotatable reflecting surface at a predetermined speed;
    n (integer not smaller than 2) number of light sources each having m (integer not smaller than 2) number of light-emitting points and capable of emitting $(m \times n)$ number of light beams, the space between each two adjacent light beams emitted from the light sources being defined to be equivalent to n number of dots on an image surface with respect to a second direction perpendicular to the first direction in which the light beams are deflected;
    n number of beam space adjusting mechanisms for collectively adjusting the spaces between the light beams from the light sources in the second direction on the image surface for each m number of light beams;
    $(n-1)$ number of beam position adjusting mechanisms for adjusting the positions of the m number of light beams from the light sources on the image surface;
    $(n-1)$ number of first composition mirrors adapted to transmit a predetermined percentage of the light quantity of the light beams and reflect the remaining percentage, whereby the $(m \times n)$ number of light beams are put together into one luminous flux passing substantially through one and the same optical path; and
    focusing optical means for continuously focusing the $(m \times n)$ number of light beams, deflected in the first direction by the deflecting means, on the image surface.

2. A multi-beam exposure unit according to claim 1, further comprising supporting means for supporting the first composition mirrors, whereby the light beams reflected and transmitted by the first composition mirrors are radiated individually at predetermined angles to the second direction.

3. A multi-beam exposure unit according to claim 1, wherein each said light source includes three light-emitting points (m=3).

4. A multi-beam exposure unit according to claim 1, wherein said beam space adjusting mechanisms include prisms located along axes (optical axes) connecting the light sources and the deflecting means and capable of providing light beams from the light sources, advancing along the axes, with predetermined angles to the second direction.

5. A multi-beam exposure unit according to claim 4, wherein said prisms include dove prism.

6. A multi-beam exposure unit according to claim 1, wherein each said beam position adjusting mechanism includes a lens mechanism movable in the advancing direction of the laser beams between each light source and the deflecting means.

7. A multi-beam exposure unit comprising:
    deflecting means for deflecting light beams in a first direction by rotating a rotatable reflecting surface at a predetermined speed;
    light sources each having light-emitting points located on the three vertexes of a triangle and capable of emitting three light beams close to one another;
    beam space adjusting mechanisms for collectively adjusting the spaces between the three light beams from the light sources in a second direction perpendicular to the first direction, on an image surface; and
    focusing optical means for continuously focusing the light beams, deflected by the deflecting means, on the image surface.

8. A multi-beam exposure unit according to claim 7, further comprising $(n-1)$ number of first composition mirrors adapted to transmit a predetermined percentage of the light quantity of the light beams and reflect the remaining percentage, whereby the $(m \times n)$ number of light beams are put together into one luminous flux passing substantially through one and the same optical path in the first direction, and (k−1) number of second composition mirrors for putting the (m×(n$_1$+n$_2$+ ... n$_k$)) number of light beams together into one luminous flux passing substantially through one and the same optical path.

9. A multi-beam exposure unit according to claim 8, wherein said second composition mirrors are situated behind the first composition mirrors in the advancing direction of the (m×n) number of light beams.

10. A multi-beam exposure unit according to claim 8, wherein each said beam position adjusting mechanism includes a lens mechanism movable in the advancing direction of the laser beams between each light source and the deflecting means.

11. A multi-beam exposure unit according to claim 7, wherein said beam space adjusting mechanisms include prisms located along axes (optical axes) connecting the light sources and the deflecting means and capable of providing light beams from the light sources, advancing along the axes, with predetermined angles to the second direction.

12. A multi-beam exposure unit according to claim 11, wherein said prisms include dove prism.

13. A multi-beam exposure unit comprising:
- (n$_1$+n$_2$+ ... n$_k$) number of light sources each having m (integer not smaller than 2) number of light-emitting points and capable of providing (m×(n$_1$+n$_2$+ ... n$_k$)) number of light beams;
- beam space adjusting mechanisms for collectively adjusting the beam spaces on an image surface for first and second cycles of exposure for each group of light sources, the adjusting mechanisms being provided individually for optical paths for the passage of the light beams emitted from the k number of groups of light sources;
- (k−1) number of second composition mirrors for putting the (m×(n$_1$+n$_2$+ ... n$_k$)) number of light beams together into one luminous flux passing substantially through one and the same optical path in the first direction;
- deflecting means for deflecting the (m×(n$_1$+n$_2$+ ... n$_k$)) number of light beams in the form of the luminous flux in predetermined directions by rotating a rotatable reflecting surface at a predetermined speed; and
- focusing optical means for continuously focusing the (m×(n$_1$+n$_2$+ ... n$_k$)) number of light beams, deflected by the deflecting means, on the image surface.

14. A multi-beam exposure unit according to claim 13, further comprising holding means for holding the second composition mirrors in an inclinable manner, whereby the light beams reflected and transmitted by the second composition mirrors are radiated individually at predetermined angles to the second direction.

15. A multi-beam exposure unit according to claim 13, wherein each said light source includes three light-emitting points (m=3).

16. A multi-beam exposure unit according to claim 15, wherein said light-emitting points included in each said light source (n) are defined to be n number of dots on the image surface with respect to the second direction perpendicular to the first direction.

17. A multi-beam exposure unit according to claim 13, wherein said beam space adjusting mechanisms include prisms located along axes (optical axes) connecting the light sources and the deflecting means and capable of providing light beams from the light sources, advancing along the axes, with predetermined angles for each group of light sources such that the beam spaces on the image surface for first and second cycles of exposure are equal.

18. A multi-beam exposure unit according to claim 17, wherein said prisms include dove prism.

19. A multi-beam exposure unit according to claim 4, wherein each said beam position adjusting mechanism includes a lens mechanism movable in the advancing direction of the laser beams between each light source and the deflecting means.

* * * * *